US010626592B2

(12) United States Patent
Dubois et al.

(10) Patent No.: US 10,626,592 B2
(45) Date of Patent: *Apr. 21, 2020

(54) FILTER FOR REMOVING SEDIMENT FROM WATER

(71) Applicant: CONTECH ENGINEERED SOLUTIONS LLC, West Chester, OH (US)

(72) Inventors: Roland Dubois, Denver, NC (US); Gregory Williams, London (CA); Scott Perry, East Aurora, NY (US); Joel Garbon, Portland, OR (US); Bob Gallucci, Rockville, MD (US)

(73) Assignee: CONTECH ENGINEERED SOLUTIONS LLC, West Chester, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/372,818

(22) Filed: Apr. 2, 2019

(65) Prior Publication Data
US 2019/0226191 A1 Jul. 25, 2019

Related U.S. Application Data

(60) Division of application No. 14/252,819, filed on Apr. 15, 2014, now abandoned, which is a continuation of
(Continued)

(51) Int. Cl.
*E03F 1/00* (2006.01)
*B01D 35/10* (2006.01)
(Continued)

(52) U.S. Cl.
CPC ............. *E03F 1/00* (2013.01); *B01D 29/114* (2013.01); *B01D 29/15* (2013.01); *B01D 29/21* (2013.01);
(Continued)

(58) Field of Classification Search
None
See application file for complete search history.

(56) References Cited

U.S. PATENT DOCUMENTS 342,151 A   5/1886  Walls
395,291 A   12/1888 Muller
(Continued)

FOREIGN PATENT DOCUMENTS

DE  202004005849   5/2005
EP       0124888   5/1984
(Continued)

OTHER PUBLICATIONS

Holt; "Experimental Characterization of Baffle Plate Influence on Turbulent and Cavitation Induced Vibrations in Pipe Flow;" BYU Scholars Archive, All Theses and Dissertations, 2011, pp. 1-131.
(Continued)

*Primary Examiner* — Robert J Popovics
(74) *Attorney, Agent, or Firm* — Thompson Hine LLP

(57) ABSTRACT

A system for removing sediment from water is disclosed. The exemplary embodiments described herein disclose a system with a chamber having a deck positioned inside to divide it into an upper chamber and a lower chamber. The deck may have a plurality of holes to hold filtration elements and also may have a ridge or a skirt or both. The filtration elements may be filter cartridges with multiple elongated filter elements that extend down into the lower chamber.

12 Claims, 27 Drawing Sheets

Related U.S. Application Data application No. PCT/US2012/062205, filed on Oct. 26, 2012, which is a continuation of application No. 13/283,000, filed on Oct. 27, 2011, now Pat. No. 8,287,726, which is a continuation-in-part of application No. 12/014,888, filed on Jan. 16, 2008, now Pat. No. 8,123,935.

(51) Int. Cl.

| | | |
|---|---|---|
| *B01D 29/11* | (2006.01) | |
| *B01D 29/21* | (2006.01) | |
| *B01D 29/52* | (2006.01) | |
| *B01D 29/54* | (2006.01) | |
| *B01D 29/66* | (2006.01) | |
| *B01D 29/72* | (2006.01) | |
| *E03F 5/14* | (2006.01) | |
| *B01D 29/15* | (2006.01) | |
| *B01D 29/74* | (2006.01) | |

(52) U.S. Cl.
CPC ............ *B01D 29/52* (2013.01); *B01D 29/54* (2013.01); *B01D 29/66* (2013.01); *B01D 29/72* (2013.01); *B01D 29/74* (2013.01); *B01D 35/10* (2013.01); *E03F 5/14* (2013.01); *B01D 2201/0446* (2013.01); *B01D 2201/0453* (2013.01); *B01D 2201/0461* (2013.01); *B01D 2201/291* (2013.01); *B01D 2201/301* (2013.01); *B01D 2201/4015* (2013.01); *B01D 2201/4038* (2013.01)

(56) References Cited

U.S. PATENT DOCUMENTS

| | | | |
|---|---|---|---|
| 556,725 A | 3/1896 | Farwell | |
| 598,191 A | 2/1898 | Wilcox | |
| 627,729 A | 6/1899 | Gudeman | |
| 739,249 A | 9/1903 | Woods | |
| 769,314 A | 9/1904 | Hill | |
| 809,201 A | 1/1906 | Lutz | |
| 838,129 A | 12/1906 | Mikolasek | |
| 1,371,110 A | 3/1921 | Pelphrey | |
| 1,437,006 A | 11/1922 | Otterson | |
| 1,468,906 A | 9/1923 | Inman | |
| 1,833,315 A | 11/1931 | Burhans | |
| 1,940,316 A | 12/1933 | McKinley | |
| 2,041,366 A | 5/1936 | Moran et al. | |
| 2,063,086 A | 12/1936 | Fitz Gerald | |
| 2,076,980 A | 4/1937 | Cooper | |
| 2,301,430 A | 11/1942 | Malanowski | |
| 2,338,418 A | 1/1944 | Forrest et al. | |
| 2,364,240 A | 12/1944 | Parry | |
| 2,371,444 A | 3/1945 | Hubert | |
| 2,381,627 A | 8/1945 | Thompson | |
| 2,392,901 A | 1/1946 | Brown | |
| 2,577,169 A | 12/1951 | Von Pentz | |
| 2,609,932 A | 9/1952 | Fricke | |
| 2,689,048 A * | 9/1954 | Powers | B01D 29/111 210/457 |
| 2,742,158 A | 4/1956 | Schuller | |
| 2,785,803 A | 3/1957 | Young | |
| 2,862,622 A | 12/1958 | Kirchner, Jr. et al. | |
| 2,864,505 A | 12/1958 | Kasten | |
| 3,016,984 A * | 1/1962 | Getzin | B01D 46/06 55/492 |
| 3,027,910 A | 4/1962 | Oliver | |
| 3,060,693 A | 10/1962 | Taylor | |
| 3,064,819 A | 11/1962 | Jones | |
| 3,165,472 A | 1/1965 | Briggs | |
| 3,195,729 A | 7/1965 | Kracklauer et al. | |
| 3,210,229 A | 10/1965 | Feine | |
| 3,233,737 A | 2/1966 | Hultgren | |
| 3,258,123 A * | 6/1966 | Fontaine | B01D 21/02 210/259 |
| 3,281,144 A | 10/1966 | Turner et al. | |
| 3,306,448 A | 2/1967 | Baker | |
| 3,312,044 A | 4/1967 | McCarter | |
| 3,326,383 A | 6/1967 | Pranovi | |
| 3,344,925 A | 10/1967 | Graham | |
| 3,364,658 A | 1/1968 | Walker | |
| 3,365,065 A | 1/1968 | Varjabedian | |
| 3,374,894 A * | 3/1968 | Webster | B01D 17/0208 210/257.1 |
| 3,385,444 A | 5/1968 | Dufournet | |
| 3,482,700 A | 12/1969 | Bebech | |
| 3,513,638 A | 5/1970 | Young | |
| 3,522,013 A | 7/1970 | Borgeson | |
| 3,524,548 A | 8/1970 | McDonald et al. | |
| 3,595,398 A * | 7/1971 | Cook | B01D 35/30 210/232 |
| 3,601,392 A | 8/1971 | Spear et al. | |
| 3,674,687 A | 7/1972 | Quase | |
| 3,698,555 A | 10/1972 | Conner | |
| 3,741,393 A | 6/1973 | Estes et al. | |
| 3,747,765 A | 7/1973 | Nowak | |
| 3,815,748 A | 6/1974 | Johannessen | |
| 3,839,850 A | 10/1974 | Jamiol | |
| 3,855,131 A | 12/1974 | Thumberger | |
| 3,876,544 A | 4/1975 | Fowler | |
| 3,923,656 A | 12/1975 | Krebs | |
| 3,931,019 A | 1/1976 | Fowler | |
| 3,950,252 A | 4/1976 | Jordan et al. | |
| 4,014,796 A * | 3/1977 | Sugiyama | B01D 29/111 210/437 |
| 4,022,693 A | 5/1977 | Morgan, Jr. | |
| 4,032,457 A | 6/1977 | Matchett | |
| 4,064,049 A | 12/1977 | Calvano | |
| RE29,996 E | 5/1979 | Jordan et al. | |
| 4,157,959 A | 6/1979 | Wen et al. | |
| 4,162,976 A | 7/1979 | Monson | |
| 4,163,724 A | 8/1979 | Muller et al. | |
| 4,167,482 A | 9/1979 | Muller | |
| 4,181,514 A | 1/1980 | Lefkowitz et al. | |
| 4,192,751 A | 3/1980 | Henton et al. | |
| 4,221,667 A | 9/1980 | Suhrheinrich | |
| 4,243,533 A | 1/1981 | Savolainen et al. | |
| 4,246,114 A | 1/1981 | Krebs et al. | |
| 4,264,345 A | 4/1981 | Miller | |
| 4,261,823 A | 7/1981 | Gallagher et al. | |
| 4,279,743 A | 7/1981 | Miller | |
| 4,298,465 A | 11/1981 | Druffel | |
| 4,322,293 A | 3/1982 | Morgan, Jr. | |
| 4,334,900 A | 6/1982 | Neumann | |
| 4,356,010 A | 10/1982 | Meyer zu Riemsloh | |
| 4,364,825 A | 12/1982 | Connor, Jr. | |
| 4,377,397 A | 3/1983 | Clements | |
| 4,398,931 A | 8/1983 | Shevlin | |
| 4,411,791 A | 10/1983 | Ward | |
| 4,416,782 A | 11/1983 | Kerres | |
| 4,436,621 A | 3/1984 | Picker | |
| 4,436,633 A | 3/1984 | Robinsky et al. | |
| 4,461,707 A | 7/1984 | Thayer et al. | |
| 4,522,717 A | 6/1985 | Brust | |
| 4,526,689 A | 7/1985 | Morgan | |
| 4,551,247 A | 11/1985 | Borchert et al. | |
| 4,552,661 A | 11/1985 | Morgan | |
| 4,624,789 A | 11/1986 | Fan et al. | |
| 4,642,188 A | 2/1987 | DeVisser et al. | |
| 4,643,836 A | 2/1987 | Schmid | |
| 4,664,798 A | 5/1987 | Bergh | |
| 4,678,567 A | 7/1987 | Ueda | |
| 4,680,111 A | 7/1987 | Ueda | |
| 4,713,174 A | 12/1987 | Zievers et al. | |
| 4,735,638 A | 4/1988 | Ciliberti et al. | |
| 4,740,221 A | 4/1988 | Howeth | |
| 4,860,591 A | 8/1989 | Garland | |
| 4,877,527 A | 10/1989 | Brownell | |
| 4,976,873 A | 12/1990 | Ross | |
| 4,983,294 A | 1/1991 | Lamb | |
| 4,983,434 A | 1/1991 | Sassa | |
| 4,997,561 A | 3/1991 | Schutz | |

(56) References Cited

U.S. PATENT DOCUMENTS

| | | |
|---|---|---|
| 5,013,461 A | 5/1991 | Drori |
| 5,133,619 A | 7/1992 | Murfae et al. |
| 5,223,154 A | 6/1993 | MacPherson, Jr. et al. |
| 5,248,415 A | 9/1993 | Masuda et al. |
| 5,252,230 A | 10/1993 | Dunkers |
| 5,294,337 A | 3/1994 | Johnson |
| 5,296,293 A | 3/1994 | Jobst |
| 5,297,367 A | 3/1994 | Sainz |
| 5,316,589 A | 6/1994 | Krieger, Jr. |
| 5,322,629 A | 6/1994 | Stewart |
| 5,330,651 A | 7/1994 | Robertson et al. |
| 5,342,144 A | 8/1994 | McCarthy |
| 5,391,295 A | 2/1995 | Wilcox et al. |
| 5,397,465 A | 3/1995 | Stewart |
| 5,405,539 A | 4/1995 | Schneider |
| 5,419,838 A | 5/1995 | DiTullio |
| 5,433,845 A | 7/1995 | Greene et al. |
| 5,437,786 A | 8/1995 | Horsley et al. |
| 5,498,331 A | 3/1996 | Monteith |
| 5,511,904 A | 4/1996 | Van Egmond |
| 5,518,609 A | 5/1996 | Karlsson |
| 5,531,888 A | 7/1996 | Geiger et al. |
| 5,536,420 A | 7/1996 | Oyzboyd |
| 5,543,038 A | 8/1996 | Johannessen |
| 5,549,817 A | 8/1996 | Horsley et al. |
| 5,562,819 A | 10/1996 | Turner, Jr. et al. |
| 5,573,349 A | 11/1996 | Paoluccio |
| 5,575,909 A | 11/1996 | Foster |
| 5,624,552 A | 4/1997 | Vales et al. |
| 5,624,576 A | 4/1997 | Lenhart et al. |
| 5,643,445 A * | 7/1997 | Billias .................. E03F 5/04 210/162 |
| 5,667,689 A | 9/1997 | Graves |
| 5,674,386 A | 10/1997 | Filion |
| 5,683,577 A | 11/1997 | Nurse, Jr. |
| 5,693,224 A | 12/1997 | Fox |
| 5,702,593 A | 12/1997 | Horsley et al. |
| 5,707,527 A | 1/1998 | Knutson et al. |
| 5,725,760 A | 3/1998 | Monteith |
| 5,744,048 A | 4/1998 | Stetler |
| 5,759,415 A | 6/1998 | Adams |
| 5,770,057 A | 6/1998 | Filion |
| 5,779,888 A | 7/1998 | Bennett |
| 5,788,848 A | 8/1998 | Blanche et al. |
| 5,814,216 A | 9/1998 | Filion |
| 5,820,762 A | 10/1998 | Bamer et al. |
| 5,849,181 A | 12/1998 | Monteith |
| 5,871,641 A | 2/1999 | Davidson |
| 5,882,528 A | 3/1999 | Davidson |
| 5,916,442 A | 6/1999 | Goodrich |
| 5,979,669 A | 11/1999 | Kitajima et al. |
| 5,980,740 A | 11/1999 | Harms et al. |
| 5,992,641 A | 11/1999 | Calwell, Jr. |
| 5,996,811 A | 12/1999 | Kitajima et al. |
| 6,027,639 A | 2/2000 | Lenhart, Jr. et al. |
| 6,045,699 A | 4/2000 | Yazawa et al. |
| 6,062,767 A | 5/2000 | Kizhnerman et al. |
| 6,068,765 A | 5/2000 | Monteith |
| 6,077,423 A | 6/2000 | Roy et al. |
| 6,077,448 A | 6/2000 | Tran-Quoc-Nam et al. |
| 6,080,307 A | 6/2000 | Morris et al. |
| 6,083,402 A | 7/2000 | Butler |
| 6,086,756 A | 7/2000 | Roy |
| 6,096,200 A | 8/2000 | Bennett |
| 6,103,132 A | 8/2000 | Seyfried et al. |
| 6,120,684 A | 9/2000 | Kistner et al. |
| 6,139,741 A | 10/2000 | McGibbon |
| 6,153,098 A | 11/2000 | Bayerlein et al. |
| 6,155,561 A | 12/2000 | Mandel |
| 6,171,507 B1 | 1/2001 | Roy et al. |
| 6,183,633 B1 | 2/2001 | Phillips |
| 6,187,183 B1 | 2/2001 | Weaver et al. |
| 6,200,484 B1 | 3/2001 | McInnis |
| 6,217,757 B1 | 4/2001 | Fleischmann |
| 6,231,758 B1 | 5/2001 | Morris et al. |
| 6,241,881 B1 | 6/2001 | Pezzaniti |
| 6,276,936 B1 | 8/2001 | Forster et al. |
| 6,277,274 B1 | 8/2001 | Coffman |
| 6,287,459 B1 | 9/2001 | Williamson |
| 6,328,167 B1 | 12/2001 | Seshimoto et al. |
| 6,337,025 B1 | 1/2002 | Clemenson |
| 6,338,595 B1 | 1/2002 | Schollen |
| 6,350,374 B1 | 2/2002 | Stever et al. |
| 6,358,405 B1 | 3/2002 | Leahy |
| 6,371,690 B1 | 4/2002 | Monteith |
| 6,379,541 B1 | 4/2002 | Nicholas |
| 6,406,218 B1 | 6/2002 | Olson |
| 6,419,843 B1 | 7/2002 | Natarius |
| 6,428,588 B1 | 8/2002 | Holyoak et al. |
| 6,428,692 B2 | 8/2002 | Happel |
| 6,468,426 B1 | 10/2002 | Klass |
| 6,475,381 B1 | 11/2002 | Gustafsson |
| 6,478,954 B1 | 11/2002 | Turner, Jr. et al. |
| 6,508,942 B2 | 1/2003 | Morimura |
| 6,511,595 B2 | 1/2003 | Crompton et al. |
| 6,533,941 B2 | 3/2003 | Butler |
| 6,547,962 B2 | 4/2003 | Kistner et al. |
| 6,602,408 B1 | 8/2003 | Berkey |
| 6,605,216 B1 | 8/2003 | Lederman |
| 6,638,424 B2 | 10/2003 | Stever et al. |
| 6,641,720 B1 | 11/2003 | Crompton et al. |
| 6,641,729 B1 | 11/2003 | Sasaki |
| 6,649,048 B2 | 11/2003 | De Ridder et al. |
| 6,730,222 B1 | 5/2004 | Andoh et al. |
| 6,776,295 B2 | 8/2004 | Morimura |
| 6,780,310 B1 | 8/2004 | Howe |
| 6,783,683 B2 | 8/2004 | Collings |
| 6,793,811 B1 | 9/2004 | Fleischmann |
| 6,796,325 B1 | 9/2004 | Courier |
| 6,797,162 B2 | 9/2004 | Happel |
| 6,814,878 B2 | 11/2004 | Tully |
| 6,849,214 B2 | 2/2005 | Patil |
| 6,866,447 B1 | 3/2005 | Parker |
| 6,869,528 B2 | 3/2005 | Pank |
| 6,886,698 B2 | 5/2005 | Tully |
| 6,913,155 B2 | 7/2005 | Bryant |
| 6,919,033 B2 | 7/2005 | Stark et al. |
| 6,951,619 B2 | 10/2005 | Bryant |
| 6,977,040 B2 | 12/2005 | McCune et al. |
| 6,991,114 B2 | 1/2006 | Allen et al. |
| 6,991,734 B1 | 1/2006 | Smith et al. |
| 6,994,490 B2 | 2/2006 | Maestro |
| 6,998,038 B2 | 2/2006 | Howard |
| 7,001,527 B2 | 2/2006 | Stever et al. |
| 7,041,213 B1 | 5/2006 | McClanahan |
| 7,052,209 B1 | 5/2006 | Kruger et al. |
| 7,083,721 B2 | 8/2006 | McClure et al. |
| 7,101,114 B1 | 9/2006 | Waters |
| 7,118,306 B2 | 10/2006 | Kruger et al. |
| 7,182,856 B2 | 2/2007 | Pank |
| 7,186,058 B2 | 3/2007 | Schluter et al. |
| 7,214,311 B2 | 5/2007 | Aberle et al. |
| 7,237,981 B1 | 7/2007 | Vitarelli |
| 7,238,281 B2 | 7/2007 | Su et al. |
| 7,288,188 B2 | 10/2007 | Al-Assfour |
| 7,294,256 B2 | 11/2007 | Happel et al. |
| 7,296,692 B2 | 11/2007 | Allen et al. |
| 7,297,266 B2 | 11/2007 | Cobb et al. |
| 7,300,226 B1 | 11/2007 | Maestro |
| 7,306,399 B1 | 12/2007 | Smith |
| 7,311,844 B1 | 12/2007 | Joyner et al. |
| 7,419,591 B2 | 9/2008 | Aberle |
| 7,425,261 B2 | 9/2008 | Siviter et al. |
| 7,455,780 B1 | 11/2008 | Joyner et al. |
| 7,459,090 B1 | 12/2008 | Collings |
| 7,465,391 B2 | 12/2008 | Heist et al. |
| 7,470,361 B2 | 12/2008 | Eberly |
| 7,473,373 B1 | 1/2009 | Danler |
| 7,485,218 B2 | 2/2009 | Dussich, I |
| 7,491,015 B2 | 2/2009 | Coppes et al. |
| 7,494,585 B2 | 2/2009 | Nino |
| 7,497,234 B2 | 3/2009 | Robinson |
| 7,507,333 B2 | 3/2009 | Meyermann |
| 7,517,450 B2 | 4/2009 | Hersey et al. |

(56) References Cited

U.S. PATENT DOCUMENTS

| | | | |
|---|---|---|---|
| 7,527,731 B2 | 5/2009 | Su et al. | |
| 7,534,344 B2 | 5/2009 | Williamson et al. | |
| 7,556,622 B2 * | 7/2009 | Mark | A61B 10/0275 |
| | | | 210/348 |
| 7,596,999 B1 | 10/2009 | Vitarelli | |
| 7,621,695 B2 | 11/2009 | Smith et al. | |
| 7,625,485 B2 | 12/2009 | Siviter et al. | |
| 7,632,403 B2 | 12/2009 | Dierkes | |
| 7,638,065 B2 | 12/2009 | Stever et al. | |
| 7,638,066 B1 | 12/2009 | Jacob et al. | |
| 7,645,390 B1 | 1/2010 | McClanahan | |
| 7,658,857 B2 | 2/2010 | Wacome | |
| 7,666,303 B2 | 2/2010 | Williams et al. | |
| 7,686,961 B1 | 3/2010 | Glynase | |
| D613,819 S | 4/2010 | DiTullio | |
| 7,699,984 B2 | 4/2010 | Andoh et al. | |
| 7,708,149 B2 | 5/2010 | Pank et al. | |
| 7,758,747 B2 | 7/2010 | Bryant | |
| 7,780,855 B2 | 8/2010 | Eberly | |
| 7,798,747 B1 | 9/2010 | de Bruijn et al. | |
| 7,799,235 B2 | 9/2010 | Olson et al. | |
| 7,833,412 B2 | 11/2010 | Holtz | |
| 7,837,869 B2 | 11/2010 | Peters et al. | |
| 7,875,190 B2 | 1/2011 | Pank | |
| 7,883,291 B2 | 2/2011 | Theisen et al. | |
| 7,892,425 B2 | 2/2011 | Generes et al. | |
| 7,918,996 B1 | 4/2011 | de Bruijn | |
| 7,927,394 B2 | 4/2011 | MacKenzie et al. | |
| 7,959,799 B2 | 6/2011 | Happel et al. | |
| 7,988,851 B2 | 8/2011 | Olson et al. | |
| 8,002,974 B2 | 8/2011 | Noling et al. | |
| 8,011,239 B1 | 9/2011 | Chadwick et al. | |
| 8,012,346 B2 | 9/2011 | Peters et al. | |
| 8,034,237 B2 | 10/2011 | Happel et al. | |
| 8,062,531 B1 | 11/2011 | Lobello | |
| 8,110,099 B2 | 2/2012 | Hersey et al. | |
| 8,110,105 B2 | 2/2012 | Allen et al. | |
| 8,123,935 B2 | 2/2012 | Murray et al. | |
| 8,147,688 B2 | 4/2012 | Adams et al. | |
| 8,152,997 B1 | 4/2012 | Olson et al. | |
| 8,216,479 B2 | 7/2012 | Lambert et al. | |
| 8,221,618 B2 | 7/2012 | Murray et al. | |
| 8,287,726 B2 | 10/2012 | Williams et al. | |
| 8,956,435 B2 * | 2/2015 | Appelo | B01D 46/06 |
| | | | 210/172.4 |
| 2001/0040124 A1 | 11/2001 | Bennett | |
| 2001/0045383 A1 | 11/2001 | Coffman | |
| 2001/0045392 A1 | 11/2001 | Gray et al. | |
| 2002/0011454 A1 | 1/2002 | Helwig | |
| 2002/0025226 A1 | 2/2002 | Maestro | |
| 2002/0030005 A1 | 3/2002 | Crompton et al. | |
| 2002/0044833 A1 | 4/2002 | Kruger et al. | |
| 2002/0117435 A1 | 8/2002 | Pank | |
| 2002/0139736 A1 | 10/2002 | Stever et al. | |
| 2003/0000892 A1 | 1/2003 | Kistner et al. | |
| 2003/0034286 A1 | 2/2003 | Butler | |
| 2003/0089652 A1 * | 5/2003 | Matsui | C02F 1/00 |
| | | | 210/163 |
| 2003/0094407 A1 | 5/2003 | De Ridder et al. | |
| 2003/0095838 A1 | 5/2003 | Maestro | |
| 2003/0127377 A1 | 7/2003 | Pank | |
| 2003/0132150 A1 | 7/2003 | Happel | |
| 2003/0141259 A1 | 7/2003 | Madrid | |
| 2003/0196951 A1 | 10/2003 | Tully | |
| 2003/0217955 A1 | 11/2003 | Strawser, Sr. | |
| 2004/0026312 A1 | 2/2004 | Tully | |
| 2004/0045883 A1 | 3/2004 | Miller, Jr. | |
| 2004/0045907 A1 | 3/2004 | Collings | |
| 2004/0055950 A1 | 3/2004 | Bryant | |
| 2004/0069715 A1 | 4/2004 | Stever et al. | |
| 2004/0074846 A1 | 4/2004 | Stever et al. | |
| 2004/0112807 A1 | 6/2004 | Aberle et al. | |
| 2004/0251185 A1 * | 12/2004 | Pitt | B01D 21/0012 |
| | | | 210/163 |
| 2005/0040113 A1 | 2/2005 | Howard | |
| 2005/0040118 A1 | 2/2005 | Bryant | |
| 2005/0056587 A1 | 3/2005 | Allen et al. | |
| 2005/0077248 A1 | 4/2005 | Stark et al. | |
| 2005/0100410 A1 | 5/2005 | Maestro | |
| 2005/0103698 A1 | 5/2005 | Eberly | |
| 2005/0145555 A1 | 7/2005 | Cobb et al. | |
| 2005/0145562 A1 | 7/2005 | Allen et al. | |
| 2005/0167372 A1 | 8/2005 | Heist | |
| 2005/0184007 A1 | 8/2005 | Allard et al. | |
| 2005/0218058 A1 | 10/2005 | Tully | |
| 2005/0238434 A1 | 10/2005 | Coppes et al. | |
| 2005/0263448 A1 | 12/2005 | Heist et al. | |
| 2006/0016767 A1 | 1/2006 | Olson et al. | |
| 2006/0102543 A1 | 5/2006 | Peters et al. | |
| 2006/0159519 A1 | 7/2006 | Schluter et al. | |
| 2006/0163147 A1 | 7/2006 | Dierkes et al. | |
| 2006/0207922 A1 | 9/2006 | Dussich | |
| 2006/0283814 A1 | 12/2006 | Williamson et al. | |
| 2007/0012608 A1 | 1/2007 | Su et al. | |
| 2007/0056889 A1 | 3/2007 | Heist et al. | |
| 2007/0068878 A1 | 3/2007 | Stever et al. | |
| 2007/0108122 A1 | 5/2007 | Andoh et al. | |
| 2007/0256966 A1 | 11/2007 | Siviter et al. | |
| 2007/0267342 A1 | 11/2007 | Cobb et al. | |
| 2007/0289908 A1 | 12/2007 | Williamson et al. | |
| 2007/0295662 A1 | 12/2007 | Joyner et al. | |
| 2008/0047886 A1 | 2/2008 | Lambert et al. | |
| 2008/0073258 A1 | 3/2008 | Su et al. | |
| 2008/0121579 A1 | 5/2008 | Dierkes | |
| 2008/0121594 A1 | 5/2008 | Dierkes | |
| 2008/0166182 A1 | 7/2008 | Smith et al. | |
| 2008/0217257 A1 | 9/2008 | Pank | |
| 2008/0277326 A1 | 11/2008 | Hersey et al. | |
| 2008/0277327 A1 | 11/2008 | Hersey et al. | |
| 2009/0014370 A1 | 1/2009 | Peters et al. | |
| 2009/0014372 A1 | 1/2009 | Siviter et al. | |
| 2009/0020466 A1 * | 1/2009 | Williams | E03F 5/14 |
| | | | 210/170.03 |
| 2009/0045128 A1 | 2/2009 | Murray et al. | |
| 2009/0045149 A1 | 2/2009 | Murray et al. | |
| 2009/0090664 A1 | 4/2009 | Eberly | |
| 2009/0101555 A1 | 4/2009 | Scarpine et al. | |
| 2009/0114577 A1 | 5/2009 | Duncan | |
| 2009/0166278 A1 | 7/2009 | Bryant | |
| 2009/0166279 A1 | 7/2009 | Happel et al. | |
| 2009/0220302 A1 | 9/2009 | Cobb et al. | |
| 2009/0255868 A1 | 10/2009 | Allen et al. | |
| 2009/0314723 A1 | 12/2009 | Jacob et al. | |
| 2010/0025313 A1 | 2/2010 | Dierkes | |
| 2010/0051525 A1 | 3/2010 | Jacob et al. | |
| 2010/0059430 A1 | 3/2010 | Adams et al. | |
| 2010/0108617 A1 | 5/2010 | Schmidt et al. | |
| 2010/0187188 A1 | 7/2010 | Ghalib | |
| 2010/0200480 A1 | 8/2010 | Kania et al. | |
| 2010/0206790 A1 | 8/2010 | Holtz | |
| 2010/0213119 A1 | 8/2010 | Generes et al. | |
| 2010/0282654 A1 | 11/2010 | Hauschild | |
| 2011/0049028 A1 | 3/2011 | Olson et al. | |
| 2011/0056890 A1 | 3/2011 | Cobb | |
| 2011/0062008 A1 | 3/2011 | Olson et al. | |
| 2011/0062088 A1 | 3/2011 | Olson et al. | |
| 2011/0100887 A1 | 5/2011 | Ballistreri | |
| 2011/0127204 A1 | 6/2011 | Andoh et al. | |
| 2011/0186492 A1 | 8/2011 | Holtz | |
| 2011/0200391 A1 | 8/2011 | Mailhot et al. | |
| 2011/0308648 A1 | 12/2011 | Polk et al. | |
| 2012/0111780 A1 | 5/2012 | Allen et al. | |
| 2012/0128423 A1 | 5/2012 | Hardgrave | |
| 2012/0132581 A1 | 5/2012 | Williams et al. | |
| 2012/0195686 A1 | 8/2012 | Hardgrave | |
| 2014/0299553 A1 * | 10/2014 | Dubois | B01D 35/10 |
| | | | 210/747.3 |
| 2016/0220930 A1 * | 8/2016 | Oz | B01D 35/10 |
| 2019/0226191 A1 * | 7/2019 | Dubois | B01D 29/114 |

FOREIGN PATENT DOCUMENTS

| | | |
|---|---|---|
| FR | 2554734 | 5/1985 |
| GB | 2112295 | 7/1983 |

(56) References Cited

FOREIGN PATENT DOCUMENTS

| JP | 63104624 | 5/1988 |
|---|---|---|
| JP | 04313381 | 11/1992 |
| WO | WO 97/41068 | 11/1997 |
| WO | WO 2001/89998 | 11/2001 |

OTHER PUBLICATIONS

Iwatsubo et al; "A Self-Excited Vibration of a Perforated Plate by Bubble Formation," Japan Society of Mechanical Engineers, Mar. 1, 1989, vol. 55, No. 511, pp. 656-662.

Testud et al, "The whistling potentiality of an orifice in a confined flow using an energetic criterion," Journal of Sound and Vibration, May 21, 2009, No. 325, pp. 769-780.

Wachel "Acoustic Pulsation Problems in Compressors and Pumps," Engineering Dynamic Inc., Nov. 1992, Section 3.1.3-3.1.4.

Advertisement for Upward-flow Stormwater Treatment of I.S.C. Environmental, Inc., Stormwailr, Jul./Aug. 2003, p. 1, p. 52.

Screenshot of website page of DCS Technologies, Media Filtration System, (c) 2003, 1 page, printed May 12, 2004.

Olson, Norman, L., "Water Quality Treatment Device for Stormwater," Mar. 6, 2003, 29 op, I.S.C. Environmental, Inc.

EP, extended Search Report and Opinion, European Application No. 14154632.5 (dated Jun. 12, 2014).

International Search Report and Written Opinion, International Application No. PCT/US2012/062205 (dated Dec. 27, 2012).

Search Report, European Application No. 14154632.5 (dated Apr. 7, 2014).

Notice to File a Response, Korean Application No. 10-2013-7007489 (dated May 24, 2013).

International Preliminary Report on Patentability, International Application No. PCT/US2008/073311 (dated Feb. 25, 2010

Search Report, European Application No. 08827298.4 (dated May 2, 2011).

Aqua Cloth Media Filtration, Aqua-Aerobic Systems, Inc. Bulletin #600H (Oct. 2006).

* cited by examiner

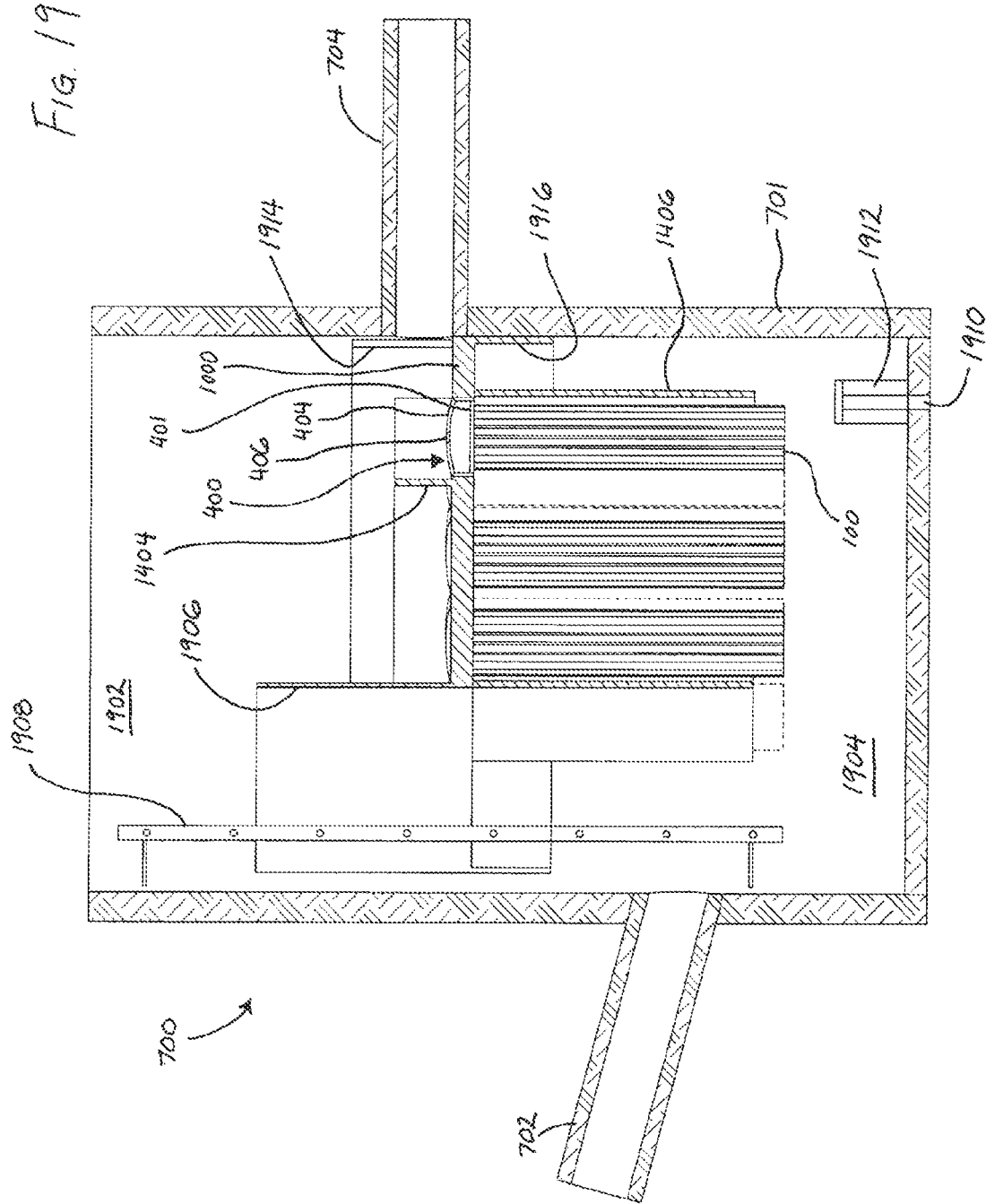

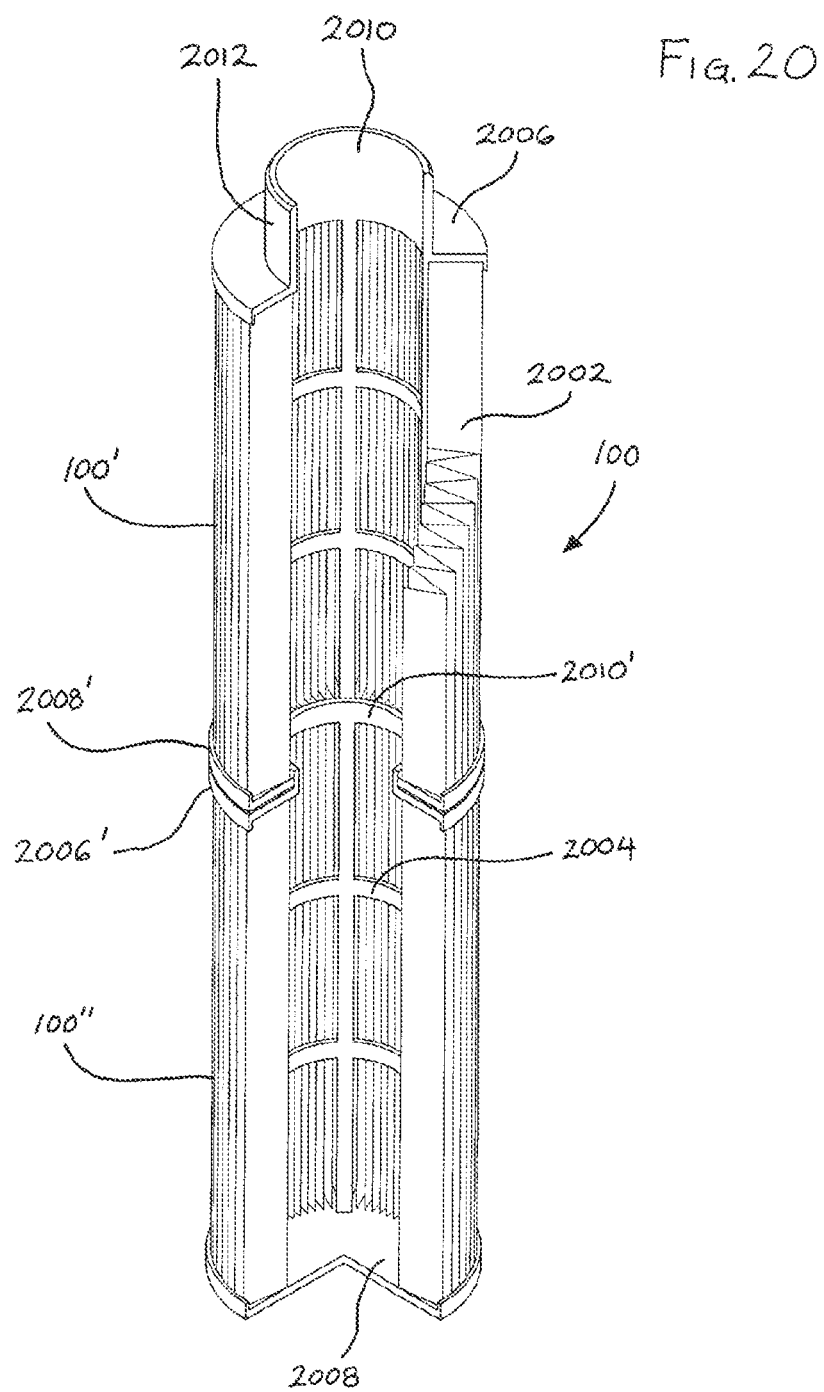

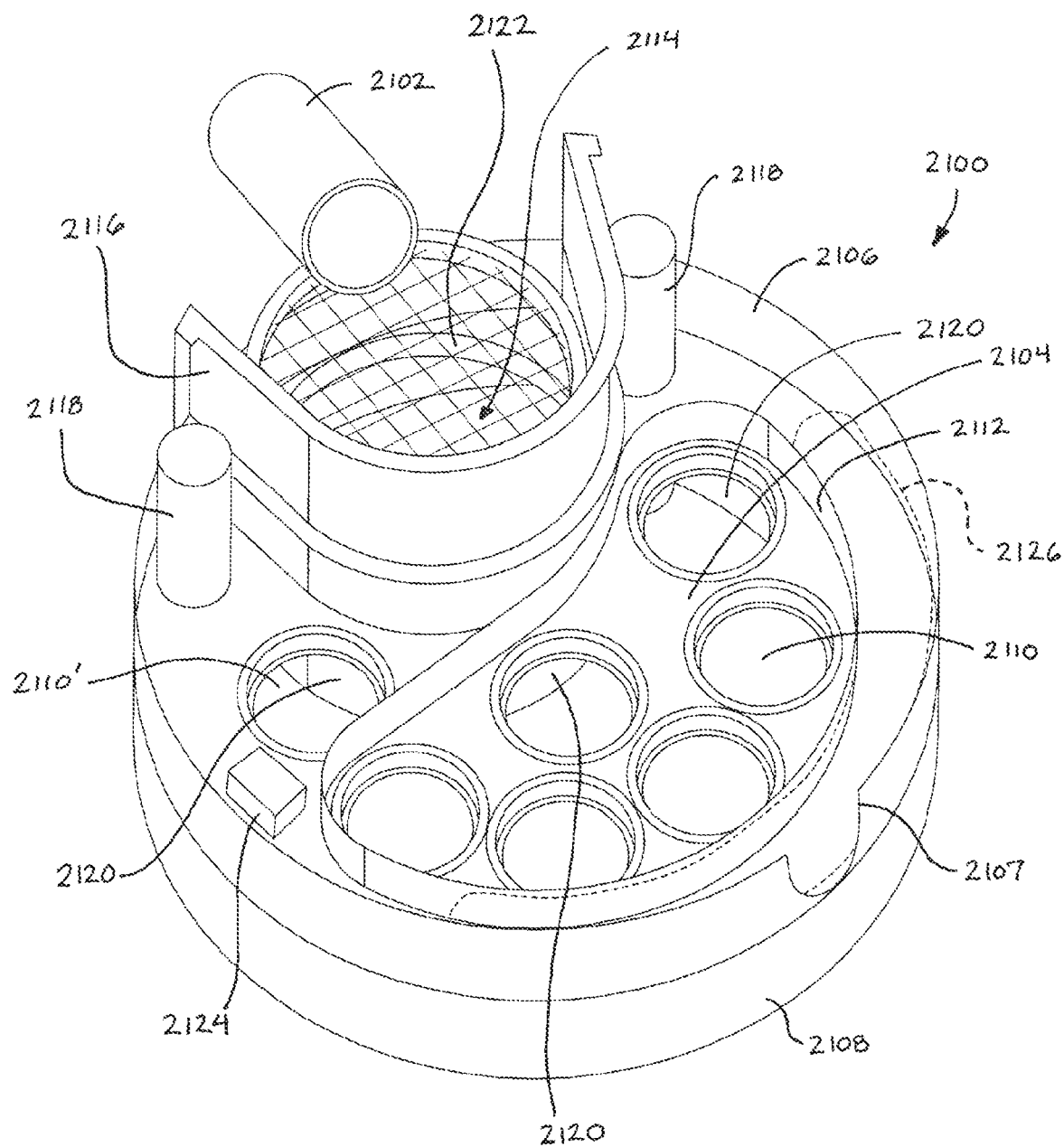

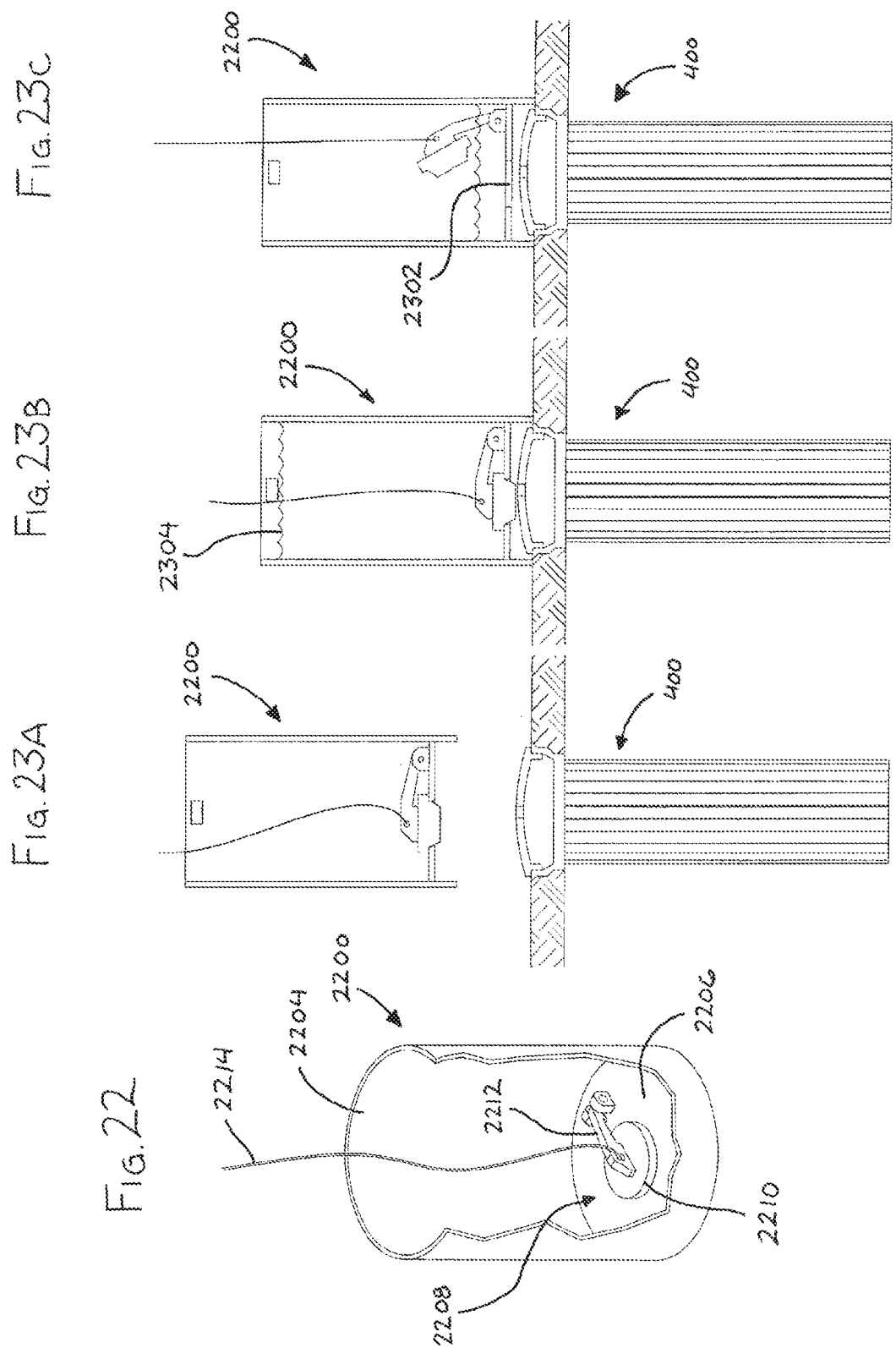

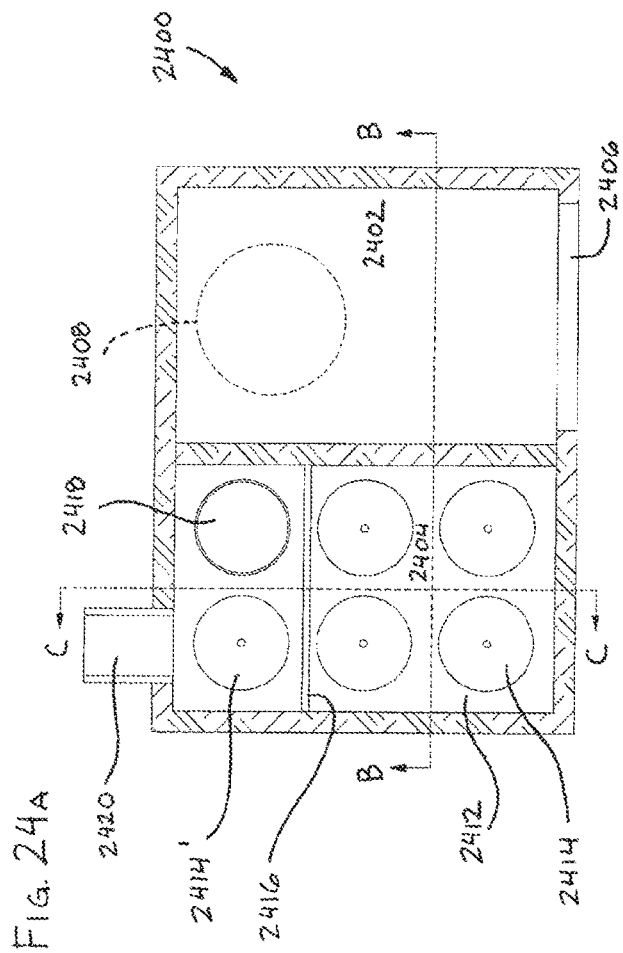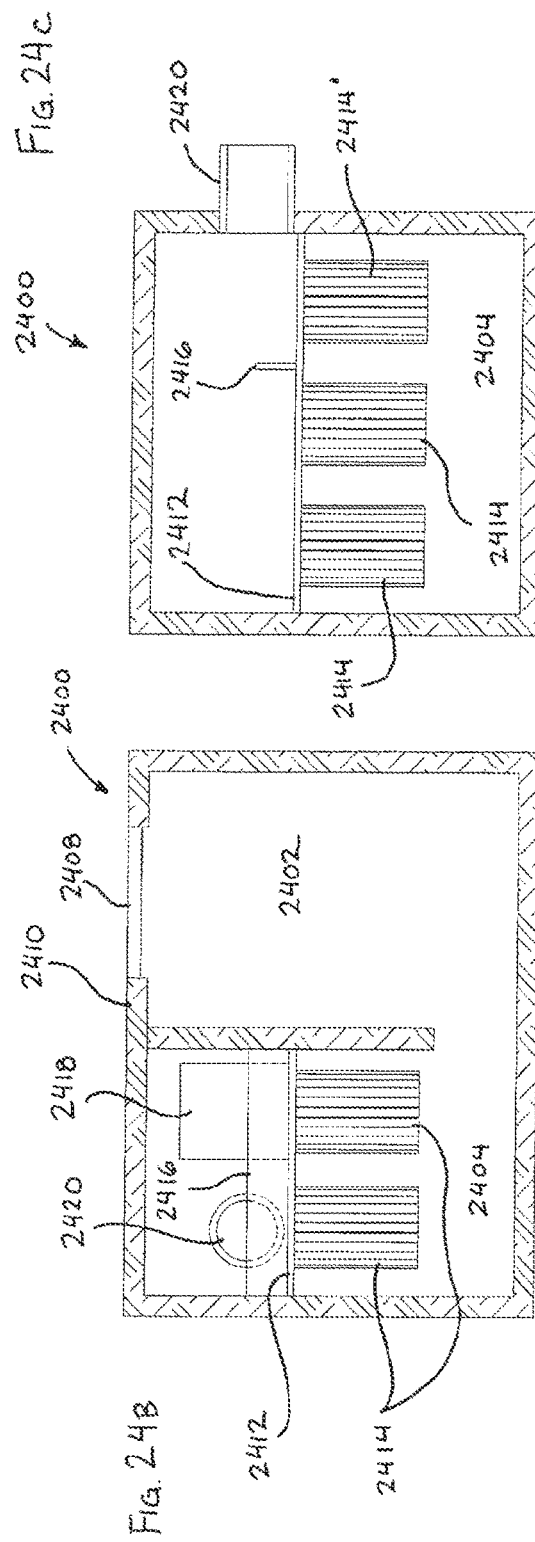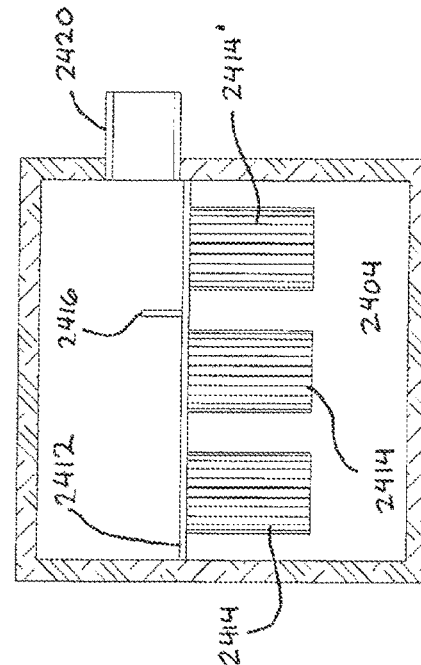

FILTER FOR REMOVING SEDIMENT FROM WATER

CROSS-REFERENCES

This is a divisional of U.S. patent application Ser. No. 14/252,819, filed Apr. 15, 2014, which is a continuation of International Patent Application No. PCT/US2012/062205 filed Oct. 26, 2012, which claims priority to U.S. patent application Ser. No. 13/283,000 filed on Oct. 27, 2011, now U.S. Pat. No. 8,287,726, which is a continuation-in-part of U.S. patent application Ser. No. 12/014,888 filed on Jan. 16, 2008, now U.S. Pat. No. 8,123,935, the entire disclosures of which are incorporated by reference.

BACKGROUND OF THE INVENTION

Field of the Invention

The present invention generally relates to an apparatus, system, and method for removing sediment from water, and, more particularly, to an elongated filtratable element used for removing sediment from stormwater.

Description of the Related Art

Stormwater runoff is rainfall or snowmelt that travels over the ground or impervious surfaces—roofs of buildings, homes and sheds, roadways, parking lots, sidewalks and driveways—and drains into natural or manmade drainage ways. In some cases, stormwater runoff drains directly into bodies of water. Stormwater runoff does not usually receive any treatment before it enters streams, lakes, and other surface waters, and it is a major source of water pollution. For example, various harmful pollutants, such as pesticides, fertilizer, litter, car oil, bacteria, trace metals, and sediment, are washed off with stormwater runoff into storm drains, or directly into streams, rivers, and lakes.

One of the harmful pollutants of major concern is sediment. Sediment is soil particles from stream banks, construction sites, and other areas, that are dislodged by stormwater runoff and deposited into streams, lakes, and rivers. Sediment accumulates in water bodies and destroys feeding grounds for aquatic life, clogs fish gills, blocks light, increases water temperature, and can cause other adverse environmental impacts.

Currently, sedimentation-based tanks are used to remove the majority of sediment that is dislodged by stormwater runoff. Sedimentation-based tanks, however, cannot completely remove all of the fine sediment from stormwater because of the required settling time needed for fine sediment to be removed from stormwater. For example, settling out the fine sediment in stormwater would require a large and uneconomical sedimentation-based tank. Therefore, in addition to sedimentation-based tanks, granular media filter systems are used downstream of sedimentation-based tanks to remove fine sediment. Granular media filter systems utilize different types of granular media to trap fine sediment in the interstitial gaps formed between the granular media. However, as the fine sediment continues to accumulate, the interstitial gaps eventually clog and must be frequently recharged. Granular media filter systems can be partially recharged through pressurized backwashing, but pressurized backwashing piping and controls are complicated and expensive.

In addition to granular media filter systems, a variety of other filter systems are available for filtering contaminated fluids. For example, filter cloths consisting of pile threads may be used, U.S. Pat. No. 6,103,132, which is incorporated by reference herein. While these types of filters and others like them have their merits, they also have their drawbacks. For example, the filters have a small amount of surface area available for trapping fine sediment. As a result, during high flow events, the filter systems quickly clog, causing the stormwater runoff to back up. In addition to filter cloths, flexible hose-type filter elements have been used, U.S. Pat. No. 4,163,724, which is incorporated by reference herein. Such hose-type filter elements, however, rely on pressurized flow to effect separation.

SUMMARY OF THE INVENTION

A system for removing sediment from water is disclosed. According to one embodiment of the present invention, the system comprises a filter chamber defining an internal chamber; a deck positioned within the internal chamber and dividing the filter chamber into an upper chamber and a lower chamber, the deck having a plurality of holes formed therein, each hole adapted to receive a filtration element therein; and an inlet line for communicating an influent liquid to the filter chamber at a location that is below the deck; wherein the inlet line is positioned such that the influent liquid is introduced tangentially into the filter chamber.

According to another embodiment of the present invention, the system comprises a filter chamber defining an internal chamber; a deck positioned within the internal chamber and dividing the filter chamber into an upper chamber and a lower chamber, the deck having a plurality of holes formed therein, each hole adapted to receive a filtration element therein; an inlet line for communicating an influent liquid to the filter chamber; and a ridge positioned on a top surface of the deck, wherein the ridge forms a perimeter on the top surface of the deck.

According to another embodiment of the present invention, the system comprises a filter chamber defining an internal chamber; a deck positioned within the internal chamber and dividing the filter chamber into an upper chamber and a lower chamber, the deck having a plurality of holes formed therein, each hole adapted to receive a filtration element therein; an inlet line for communicating an influent liquid to the filter chamber; and a skirt positioned on a bottom surface of the deck.

BRIEF DESCRIPTION OF THE DRAWINGS

For a more complete understanding of the present invention, the objects and advantages thereof, reference is now made to the following descriptions taken in connection with the accompanying drawings.

FIG. 19 is a cutaway side view of a filtration system according to one embodiment of the present invention.

FIG. 20 is a cutaway isometric view of a filtratable element according to one embodiment of the present invention.

FIG. 21 is an isometric view of a filtration system according to another embodiment of the present invention.

FIG. 22 is a partially cutaway isometric view of a filter backflush unit according to one embodiment of the present invention.

FIGS. 23A-C are cutaway side views of the filter backflush unit of FIG. 22 shown in three stages of operation.

FIGS. 24A-C are plan, and side elevation views of another embodiment of a filtration system, with FIG. 24B being a view along line B-B of FIG. 24A, and FIG. 24C being a view along line C-C of FIG. 24A.

DETAILED DESCRIPTION OF PREFERRED EMBODIMENTS

Figures 1A, 1B:
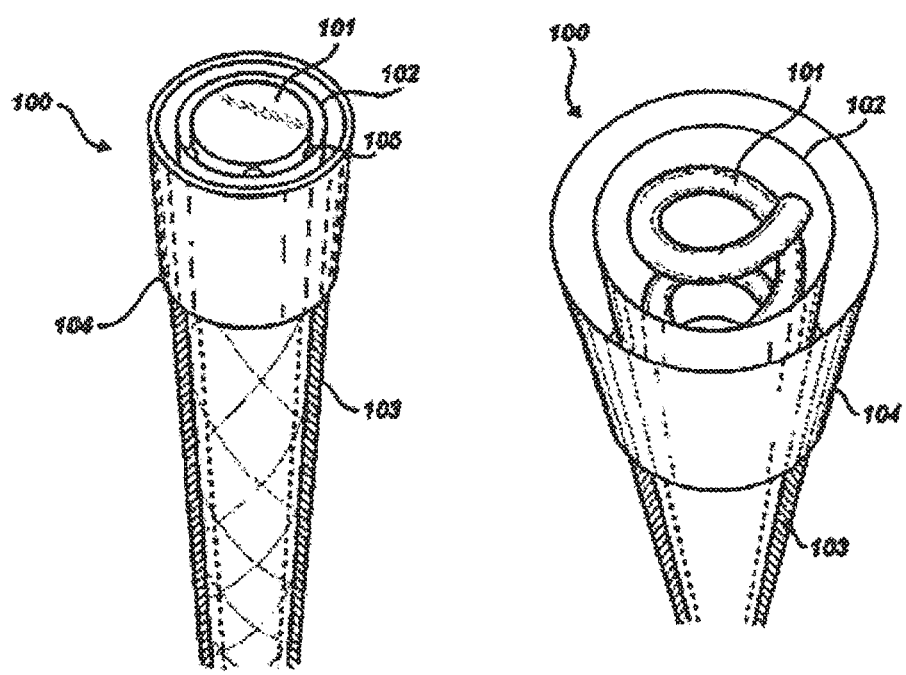
FIG. 1A is a perspective view of an elongated filtratable element according to one embodiment of the present invention.
FIG. 1B is a perspective view of an elongated filtratable element according to one embodiment of the present invention.

Although the present invention is described in the context of stormwater filtration, the invention is not so limited. Rather, the present invention has application as a filter media for many types of liquid, including water. Stormwater runoff generally has an "organic portion" and an "aqueous portion." The organic portion of stormwater runoff typically has a relatively high amount of sediment, which includes, for example, dislodged soil particles from stream banks, construction sites, and other areas, as well as other suspended particles that may or may not be organic. The aqueous portion of stormwater is primarily water. As used herein, the term "downstream" in a process system means later in the direction of general process or fluid flow, and the term "upstream" means earlier in the direction of general process or fluid flow.

Disclosed embodiments of the present invention and their advantages may be understood by referring to FIGS. 1-14, wherein like reference numerals refer to like elements.

In accordance with an embodiment of the present invention described herein is an elongated filtratable element that has a large amount of surface area for filtering a substantial amount of fine sediment from stormwater. The disclosed filtratable element can be used individually or in combination with other filtratable elements. And, the filtratable elements can be combined with current stormwater filtering systems to improve efficiency.

According to one embodiment of the present invention, the elongated filtratable element may be a tubular element or hollow tube with a permeable fiberglass filter media that surrounds a flexible inner core. The fiberglass filter media may have a porosity such that it allows the aqueous portion of stormwater to pass through, while trapping sediment.

Referring to FIGS. 1A-1E, perspective views of elongated filtratable element 100 and its components are shown. Referring to FIG. 1A, according to one embodiment, each elongated filtratable element 100, or tentacle, includes three general components: support member 101, filter mat 102, and outer casing 103. In general, support member 101 prevents the surrounding filter mat 102 from collapsing. Filter mat 102 consists of any permeable filtratable material that surrounds inner core 101. Filter mat 102 may be adapted to filter a substantial amount of fine sediment from stormwater runoff Outer casing 103 protects filter mat 102 from abrasion. Each component will be described in greater detail below.

In one embodiment, support member 101 may be adapted to be an inner core that serves as a frame for elongated filtratable element 100, and may be provided to prevent elongated filtratable element 100 from collapsing upon itself. Support member 101 may comprise a flexible support tube made of any water permeable member, such as a polymer membrane. While any water permeable polymer materials may be used, in one embodiment, support member 101 may be made of a plastic, such as polyurethane, acrylate, polypropylene or polyethylene.

In another embodiment, support member 101 may be made of any water impermeable member. Support member 101 may be adapted so that it has a negligible effect on sediment removal and has negligible head loss associated with it under typical flows.

In another embodiment, support member 101 may comprise a more rigid, even an inflexible, support structure made of metal or plastic that is adapted to allow for the passage of stormwater. Support member 101 may be manufactured by way of plastic injection molding, as is well known in the art.

In still another embodiment, support member 101 may be an inner frame comprised of support rings or rods, or a combination of both. In still another embodiment, support member 101 may be formed as an integral component of filter mat 102. Support member 101 may be of any suitable shape, and for example, may be round, square, or rectangular in shape. Support member 101 may be made of a corrosion-resistant material, as is well known in the art. Other sizes, shapes, or materials may be used for support member 101 as necessary and/or desired.

Referring to FIG. 1B, support member 101 is shown according to another embodiment of the present invention. In this embodiment, support member 101 may be a flexible coil that serves as the foundation for the elongated filtratable element 100.

Filter mat 102 serves to filter and trap sediment and other particles in stormwater. In one embodiment, filter mat 102 may comprise a tube of non-woven filtration media that surrounds support member 101, if provided. In one embodiment, shown in FIG. 2, filter mat 102 may be comprised of two parts: backing mesh 202 and fiberglass batting 201. Backing mesh 202 may include a comparatively course, non-woven plastic support layer, and fiberglass batting 201 may include a plurality of individual fiberglass fibers.

The use of fiberglass batting 201 provides several advantages. For example, fiberglass batting 201 may be high in surface area, self-cleanable, easily maintained, durable, and economical.

In order to create filter mat 102, a plurality of fiberglass fibers, of the same or different diameters and/or lengths, may be attached to backing mesh 202. In another embodiment, filter mat 102 may be comprised of any natural filaments or synthetic filaments. For example, filter mat 102 may also comprise graphite filaments, metallic filaments, glass filaments, polymer fibers, or any other suitable material as necessary and/or desired.

In one embodiment, filter mat 102 may have a relatively high porosity (i.e., it allows relatively large particles to pass). For example, backing mesh 202 may be comprised of 10-20 μm plastic fibers that form openings of more than about 200 μm, and fiberglass batting 201 may be comprised of less than 1 μm fiberglass fibers that are loosely packed.

In another embodiment, filter mat 102 may have a relatively low porosity (i.e., it allows only relatively small particles to pass). In this embodiment, backing mesh 202 may be comprised of 10-20 μm plastic fibers that form openings of less than about 200 μm, and fiberglass batting 201 may be comprised of less than 1 μm fiberglass fibers that are tightly packed.

One of ordinary skill in the art can readily determine appropriate fiber length, diameter, and percentage of porosity for filter mat 102 depending on the expected stormwater flow rate and sediment particle size.

Figure 3A:
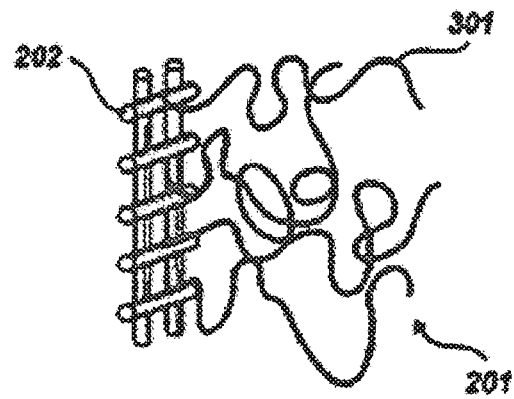
FIGS. 3A-3C are perspective views of magnified sections of a filter mat according to one embodiment of the present invention.
Figure 3B:
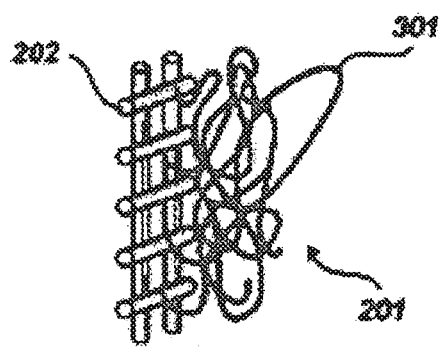
Figure 3C:
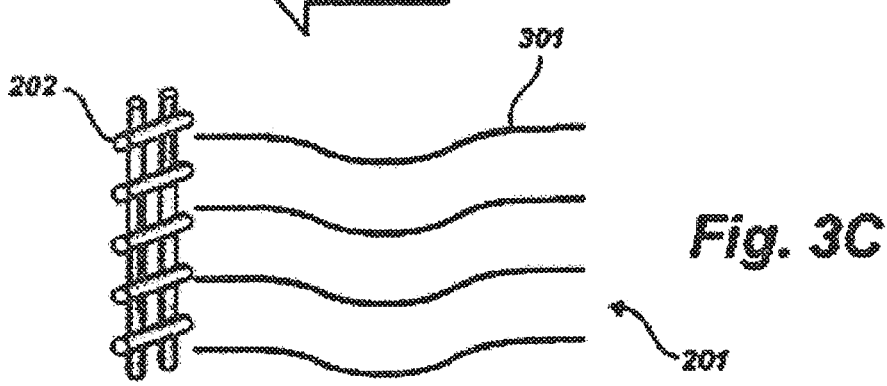

Referring to FIG. 3A, a magnified portion of filter mat 102 is shown, according to one embodiment of the present invention. In one embodiment, individual filter media filaments 301, made of any suitable material, are attached to backing mesh 202. In the aggregate, individual filaments 301 comprise fiberglass batting 201. When filter mat 102 is exposed to stormwater flow, as shown in FIG. 3B, fiberglass batting 201 may be pressed against backing mesh 202 to create a compact, yet permeable, filter bed. When filter mat 102 is backwashed, as shown in FIG. 3C and described in greater detail below, filtrate flows through each filtratable element 100 in the opposite direction, causing filaments 301 of fiberglass batting 201 to be forced away from backing mesh 202. Backwashing regenerates each element 100 by removing a substantial amount of trapped sediment.

Figure 1C:
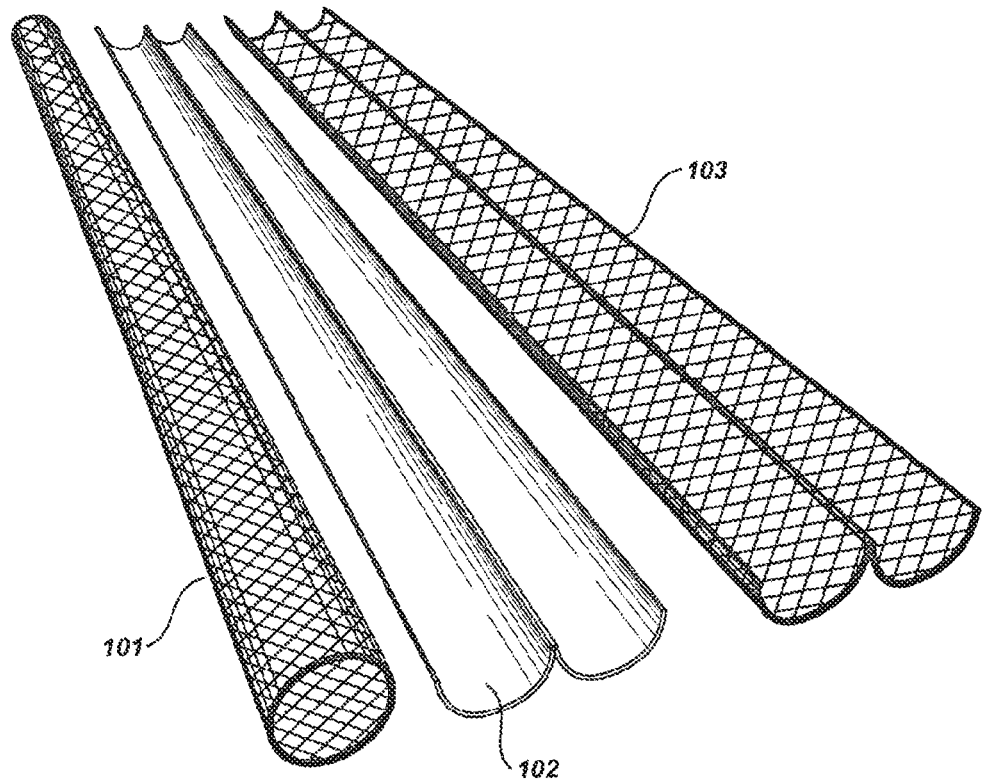
FIG. 1C is a perspective view of each component that comprises a filtratable element according to one embodiment of the present invention.
Figure 1D:
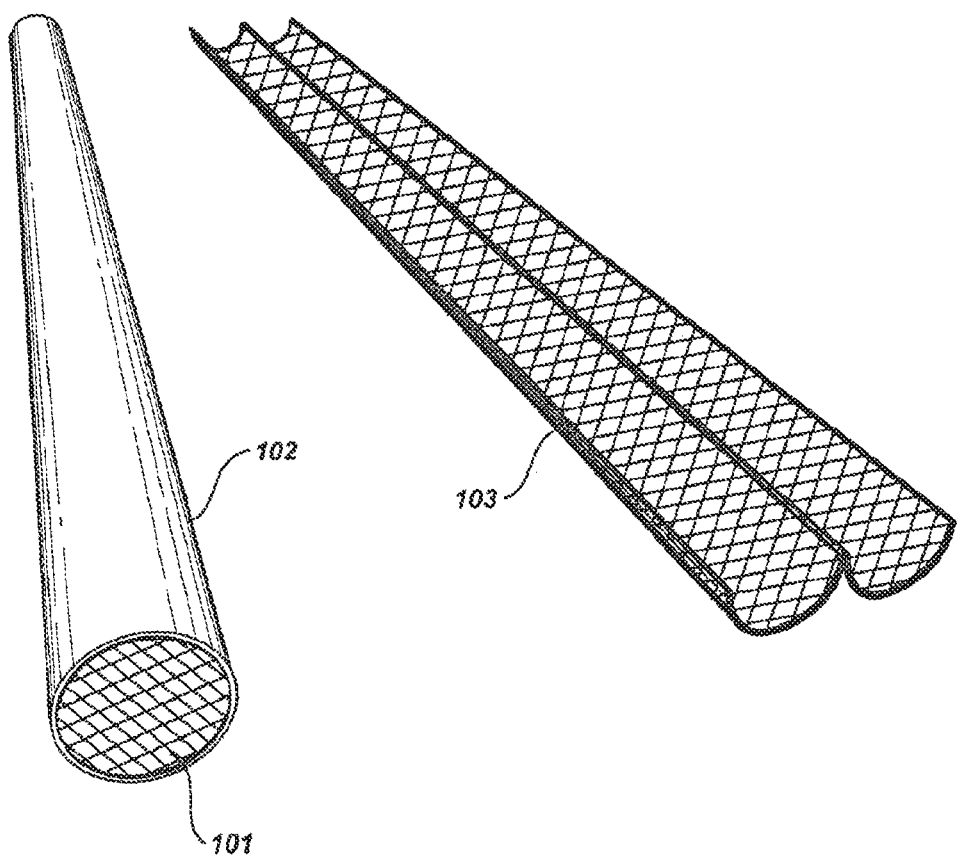
FIG. 1D is a perspective view of a partially assembled filtratable element according to one embodiment of the present invention.
Figure 1E:
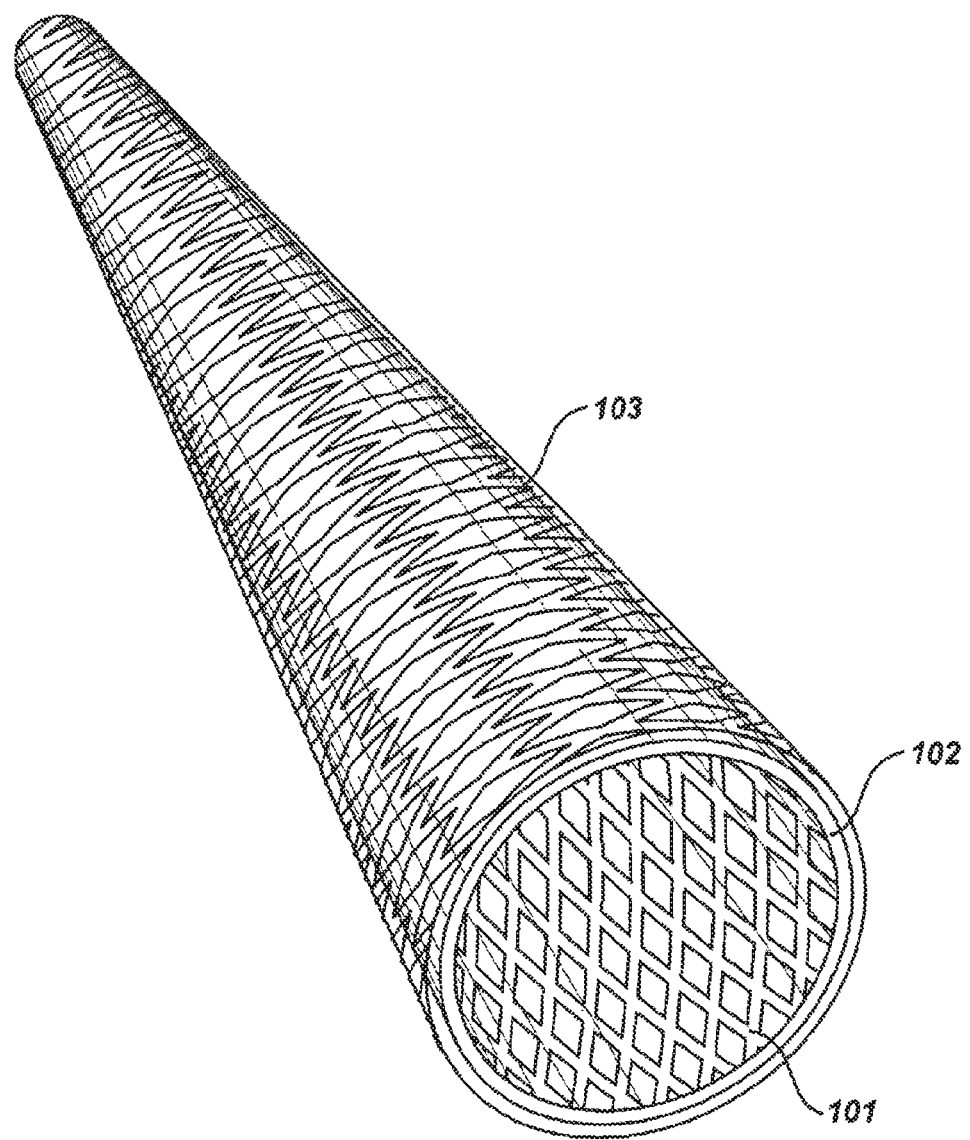
FIG. 1E is a perspective view of fully assembled filtratable element according to one embodiment of the present invention.
Figure 2:
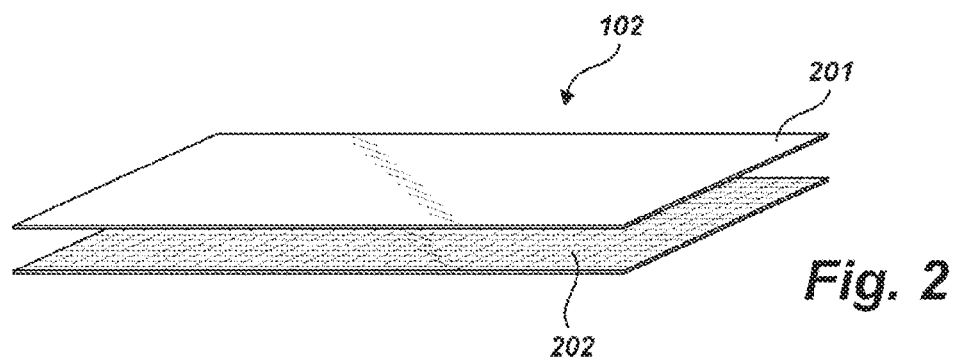
FIG. 2 is a perspective view of a preassembled filter mat according to one embodiment of the present invention.

Referring to FIGS. 1C-1E, filter mat 102 may be formed into a tube. Filter mat 102 may be adapted to surround support member 101 so that backing mesh 202 faces or contacts support member 101. Filter mat 102 may consist of two half-cylinders. The half-cylinders may be connected by a hinge. As an example, filter mat 102 may be snap-fitted over support member 101, as best shown in FIG. 1D. Filter mat 102 may also be adapted such that it is not a rigid element, and it may be folded over support member 101. Outer casing 103 may be adapted to surround filter mat 102. In one embodiment, outer casing 103 may consist of two half-cylinders. The half-cylinders may be connected by a hinge. As an example, outer casing 103 may be snap-fitted over filter mat 102, as best shown in FIG. 1E.

Referring back to FIGS. 1A and 1B, spacers 105 may be disposed between support member 101 and filter mat 102. Spacers 105 may be used to fasten or attach filter mat 102 to support member 101. Spacers 105 may also allow for the aqueous portion of the stormwater to freely permeate through filter mat 102. Spacers 105 may be made of the same material as support member 101, or any other suitable material. The size, shape, number, and location of spacers 105 may be varied as necessary and/or desired.

Outer casing 103, according to one embodiment of the present invention, protects filter mat 102 and fiberglass batting 201 from abrasion. Because stormwater runoff may contain a substantial amount of sediment, it has a tendency to abrade and destroy unprotected filter media as it permeates through. Outer casing 103 may also protect filter mat 102 from abrasion that may be caused by large debris or occur during normal handling of the filtratable element 100 or groups of elements, such as during typical packaging, transportation, and installation activities. In one embodiment, outer casing 103 may be a wire mesh screen. In another embodiment, outer casing 103 may be a nylon screen. The mesh size of outer casing 103 may be adapted such that the screen does not trap sediment, nor become clogged. One of ordinary skill in the art can readily determine the appropriate mesh size. Further, in addition to protecting filter mat 102 from abrasion, outer casing 103 adds to the stability and strength of the elongated filtratable element 100.

In one embodiment, elongated filtratable element 100 may be constructed without outer casing 103. Under some flow conditions and depending on the amount of sediment expected in the stormwater runoff, outer casing 103 may be unnecessary. Moreover, filter mat 102 may be constructed of a material that reduces the risk of abrasion and eliminate the need for outer casing 103. One of ordinary skill in the art can readily determine the need for outer casing 103.

In one embodiment, support member 101, filter mat 102, and outer casing 103 may be coated or treated with an antimicrobial agent. Antimicrobial agents are materials that are able to reduce or eliminate the microbial growth, e.g., bacteria, yeasts, molds. Microbes, if left untreated, may reduce the separation efficiency of filtratable elongated element 100, and eventually clog the filter media. In one embodiment, chitosan may be introduced into the stormwater or used to coat filtratable element 100 to prevent or reduce microbial degradation. Chitosan causes the fine sediment particles to bind together and may also remove phosphorus, heavy minerals, and oils from stormwater. Other antimicrobial agents may also be used as necessary and/or desired.

Elongated filtratable element 100 may be adapted to increase the available surface area for removing sediment. In one embodiment, this may involve pleating, crimping, or finning the surface of elongated filtratable element 100. Other constructions that increase the surface area may be used as necessary and/or desired.

In one embodiment, elongated filtratable element 100 may be provided with a packing or granular filtration media, for example, sand, polyethylene beads, clay, perlite, etc., in order to adsorb contaminants that might be present in stormwater.

Figure 4A:
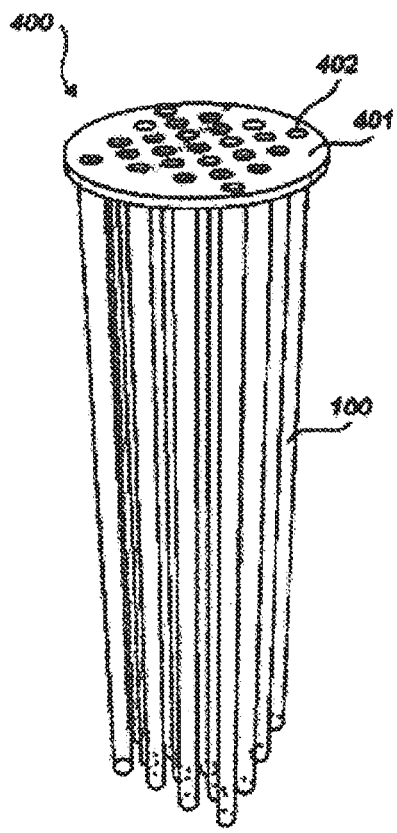
FIGS. 4A-4B are perspective views of a filtration cartridge according to one embodiment of the present invention.
Figure 4B:
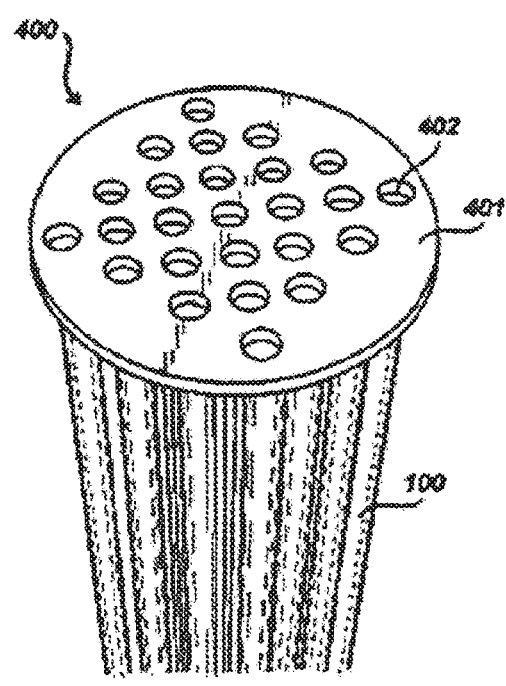

Referring to FIGS. 4A and 4B, filtration cartridge 400 is shown, according to embodiment of the present invention. Filtration cartridge 400 may include two general components: central manifold 401 and a plurality of elongated filtratable elements 100. Central manifold 401 may be a deck with a plurality of holes 402, adapted to receive a plurality of elongated filtratable elements 100. Central manifold 401 may also be considered a plate. Central manifold 401 may also be a tube having top and bottom plates that are separated by a gap. The tube may be of any suitable shape. For example, it may be cylindrical or cubical.

In one embodiment, central manifold 401 may be comprised of an impermeable plastic, and it may be of any suitable shape. For example, central manifold may be round, square, or rectangular in shape. In one embodiment, the shape of central manifold 401 may be selected to correspond to the opening in which it is to be placed.

In one embodiment, central manifold 401 may also be coated with an antimicrobial agent to prevent unwanted microbe growth, as discussed above.

Central manifold 401 may include a plurality of holes 402, with each hole 402 being sized and adapted to receive at least one elongated filtratable element 100.

Figures 5A, 5B:
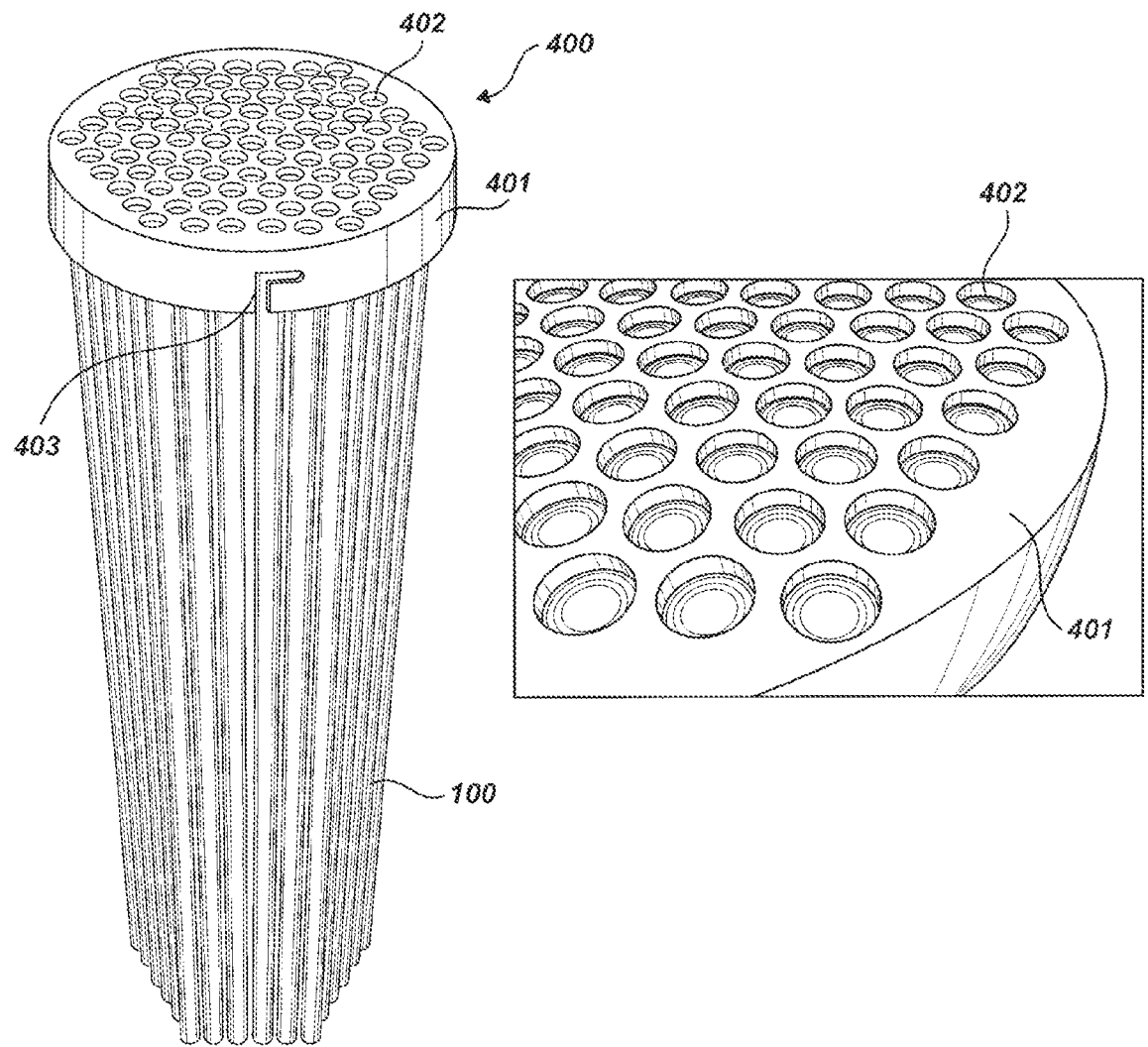
FIG. 5A-5B are perspective views of a filtration cartridge according to one embodiment of the present invention.

Referring to FIGS. 5A and 5B, according to one embodiment of the present invention, central manifold 401 of filtration cartridge 400 may have a sidewall with at least one notch 403. Notch 403 may be provided so that central manifold 401 may be easily fitted into stormwater filtration systems.

Figure 5C:
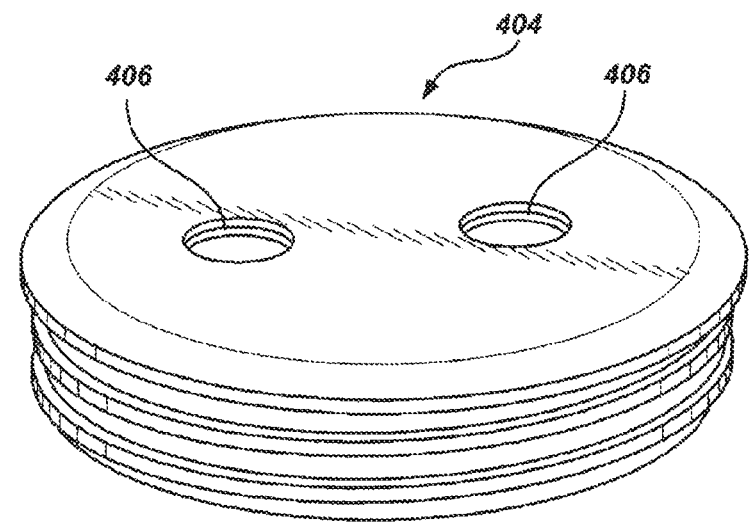
FIGS. 5C-5D are perspective views of a lid for the filtration cartridge according to one embodiment of the present invention.
Figure 5D:
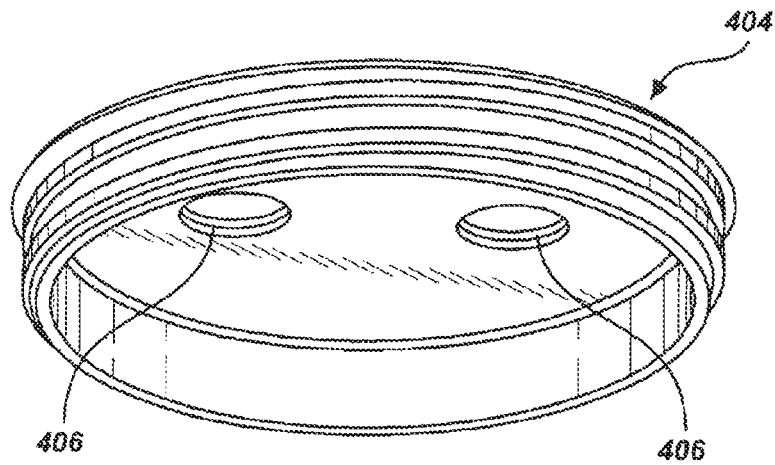
Figure 6B:
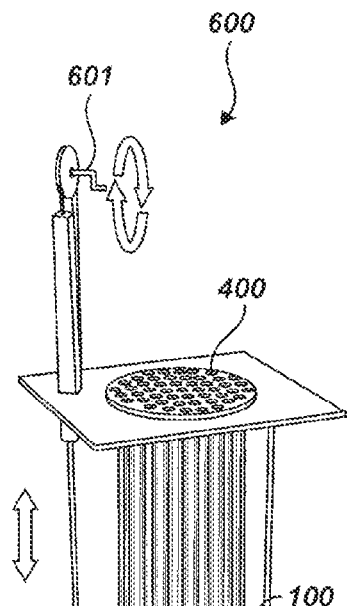
FIGS. 6A-6D are perspective views of a shaking mechanism according to one embodiment of the present invention.
Figure 6B:
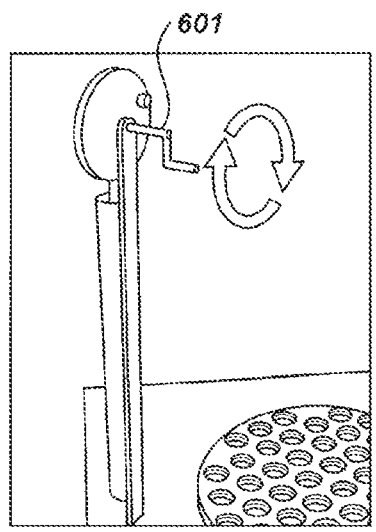
Figure 6C:
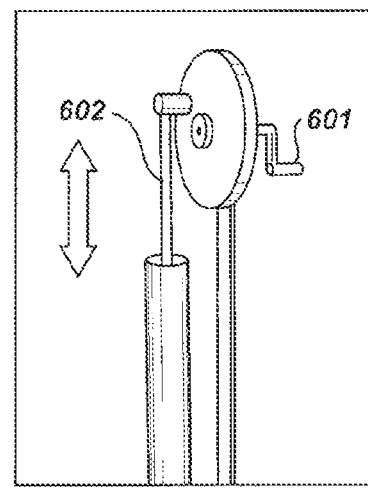
Figure 6A:
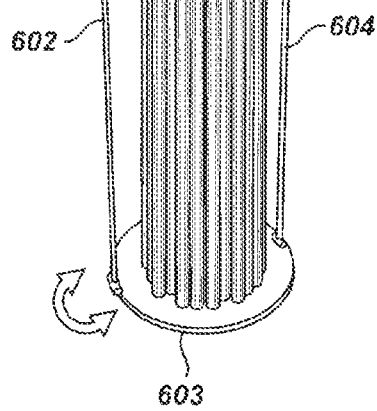
Figure 6D:
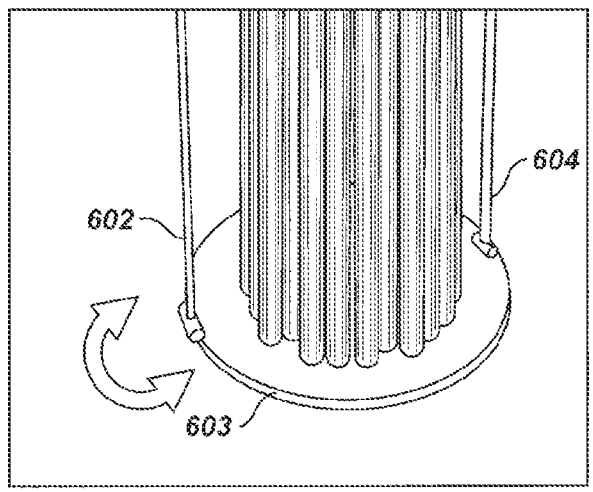

Referring to FIGS. 5C and 5D, filtration cartridge 400 may be fitted with a lid 404. Lid 404 may have at least one hole 406 for restricting flow through elongated filtratable elements 100 that are attached to central manifold 401. In one embodiment, lid 404 may have only one hole 406. In another embodiment, lid 404 may have two holes 406. Other numbers and arrangements of holes 406 may be used as necessary and/or desired.

Lid 404 may have threaded walls. Each filtration cartridge 400 may have a ring (not shown) that fits around cartridge 400 so that lid 404 may be attached to cartridge 400. Each filtration cartridge 400 with lid 404 attached thereto may be installed into a filtration system. Lid 404 may be of any suitable shape. Further, the amount of space between the top of filtration cartridge 400 and the bottom of lid 404 may be changed as necessary and/or desired.

With reference to FIGS. 1, 4A, 4B, 5A and 5B, each elongated filtratable element 100 may be fitted with a cap 104 for attaching each elongated filtratable element 100 to central manifold 401. For example, in one embodiment, holes 402 may be sized to hold 1" diameter elongated filtratable elements 100. In another embodiment, each hole 402 may be adapted to hold more than one elongated filtratable element 100. Further, the shape of holes 402 may vary to accommodate differently shaped elongated filtratable elements 100.

In one embodiment, holes 402 are open and uncovered so as to reduce the chance of additional clogging. Although, in another embodiment, holes 402 can be provided with a filter, for example, a layer of porous media, to provide an additional filtration. The porous media may also be able to adsorb or to react with dissolved components in the water.

In one embodiment, filtration cartridge 400 may include a substantial number of filtratable elements 100. For illustration only, more than 100 elongated filtration elements 100 may be provided. More or fewer filtration elements 100 may be provided. Each elongated filtration element 100 may be about 1" in diameter, although each filtration element 100 may have a different diameter, length, and/or shape.

Filtration cartridge 400 may be of any size and shape to accommodate different operating conditions. Filtration cartridge 400 may be assembled such that elongated filtration elements 100 dangle freely from cartridge 400. Because each elongated element 100 may be flexible and dangle freely from cartridge 400, filter cartridge 400 may be easily maintained by mechanical means, such as vibration and/or shaking. Moreover, if one elongated filtratable element 100 becomes clogged or damaged, filtration cartridge 401 allows for it to be individually replaced.

Referring to FIGS. 6A-6D, a shaking mechanism for filtration cartridge 400 is shown, according to an embodiment of the present invention. In one embodiment, shaking mechanism 600 may be an accessible, manually-operated mechanism that includes a hand crank 601, a shaft 602, a base 603, and a bar 604. Shaking mechanism 600 may be designed such that it causes at least one filtration cartridge 400 to rotate, thereby removing any trapped sediment from each elongated element 100. Hand crank 601 may be adapted so that it extends above filtration cartridge 400 and may be easily turned. Turning hand crank 601 causes shaft 602 to rotate base 603. Bar 604 connects base 603 to a deck in which filtration cartridge 400 may be installed. The rotating motion of filtration cartridge 400 causes the freely dangling elongated filtratable elements 100 to shake, which may remove trapped sediment. In another embodiment, shaking mechanism 600 may be automated. Other shaking and/or vibration mechanisms may be used as necessary and/or desired.

Figure 7:
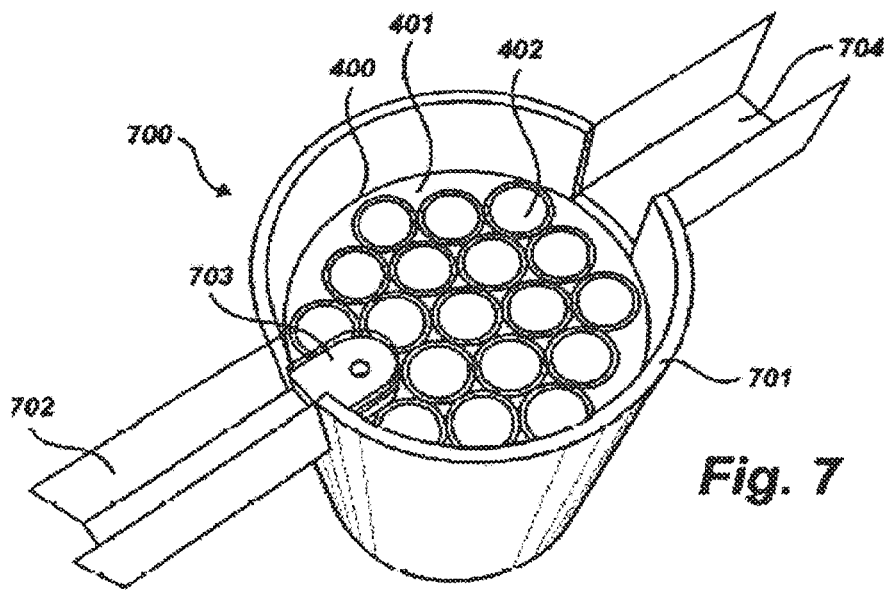
FIG. 7 is a perspective view of a filtering system according to one embodiment of the present invention.

Referring to FIG. 7, a filtration system 700 is shown, according to one embodiment of the present invention. Filtration system 700 may include five general components: a filtration chamber 701, an inlet line 702, an inlet device 703, one or more filtration cartridges 400, and an outlet line 704. In general, one or more filtration cartridges 400 may be placed inside filtration chamber 701. If more than one filtration cartridge 400 is placed inside filtration chamber 701, a deck may be used. Inlet line 702 introduces stormwater into filtration chamber 701 through inlet device 703, and outlet line 704 discharges the filtrate.

In one embodiment, filtration chamber 701 may house a single filtration cartridge 400. Filtration chamber 701 may either be open to the atmosphere, or it may be enclosed. Further, filtration chamber 701 may either be located aboveground or underground. Filtration chamber 701 may be of any conventional type or shape and may be constructed from steel, fiberglass, concrete, or plastic, or other suitable materials.

Filtration cartridge 400 may be flush with the walls of filtration chamber 701 so as to prevent stormwater from seeping upwards between filtration cartridge 400 and filtration chamber 701. Filtration cartridge 400 may be fitted with a conformable seal to contact the sidewalls of filtration chamber 701 to prevent seepage.

In another embodiment, filtration chamber 701 may house a plurality of filtration cartridges 400, using a deck. One of ordinary skill in the art can readily determine the number of filtration cartridges, and, correspondingly, the number of elongated filtratable elements 100 needed for a given operation. One advantage to filtration chamber 701 having a plurality of filtration cartridges 400 is that more filtration cartridges 400 provides for more filtratable surface area, increasing the operating life of and flow rate through filtration system 700. In another embodiment, filtration cartridge 400 may be configured or fitted in a different arrangement. For example, filtration cartridge 400 may be adapted to be horizontal or inverted. Further filtration cartridge 400 may be located inside inlet line 702. Other configurations and locations for filtration cartridge 400 may be used as necessary and/or desired.

Figure 8:
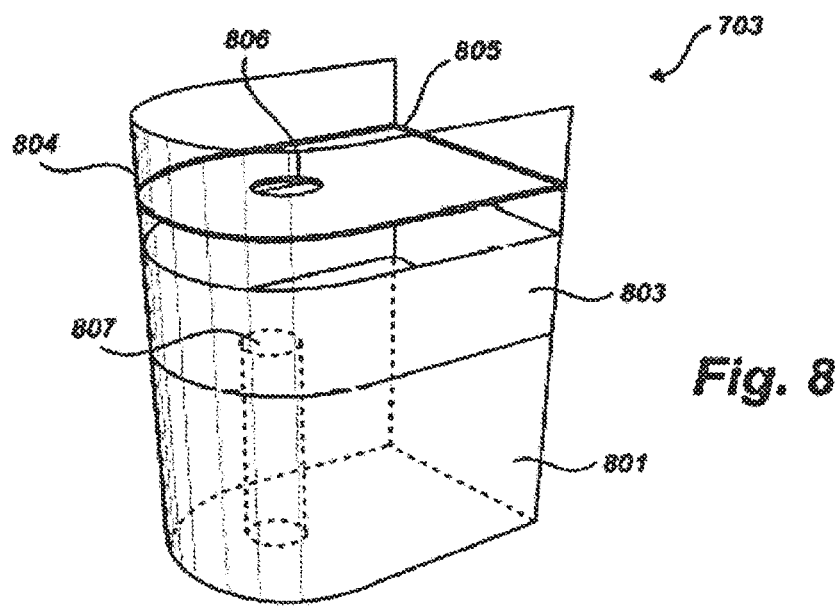
FIG. 8 is a perspective view of the inlet device according to one embodiment of the present invention.

Referring to FIG. 8, inlet device 703 is shown, according to one embodiment of the present invention. Inlet device 703 consists of a mesh screen 804, a deck 805, a weir 803, and a base 801. Base 801 may be comprised of a buoyant, impermeable material. Base 801 may have a hole 807 formed through it to allow stormwater to fill filtration chamber 701. In another embodiment, base 801 may be made of a porous material instead of having a hole. In one embodiment, weir 803 may be attached to and extend upward from base 801. Weir 803 may be comprised of a water-impermeable material. Mesh screen 804 may be attached to base 801 and may extend upwardly above and outside of weir 803. Mesh screen 804 forms a porous wall. In one embodiment, mesh screen 804 may be a wire or nylon mesh screen, with a mesh size that is larger than the expected sediment particle size. Impermeable deck 805 may be attached to mesh screen 804 above the top of weir 803. Deck 805 forms an impermeable deck and has a small inlet hole 806, in which stormwater flows through. The stormwater may be introduced from inlet line 702, through inlet device 703, and into filtration chamber 701. In one embodiment, deck 805 may be sloped so that the influent stormwater is directed toward hole 806.

Inlet device 703 may be adapted so that it moves with the level of the stormwater in filtration system 700. During operation, inlet device 703 may be positioned such that the top of base 801 may be level with the bottom of inlet line 702. In this arrangement, the influent stormwater may be directed into the filtration chamber 701 through hole 807. Weir 803 may prevent unfiltered stormwater from bypassing inlet device 703. Weir 803 may also prevent unfiltered stormwater from backing up into inlet device 703. During high flow events—which generally correspond to infrequent operating conditions, such as those during flooding or a thunderstorm or other high-intensity runoff events—water may pass over inlet device 703, through mesh screen 804, and flow downstream, to prevent the filtration system from backing up.

Figure 9A:
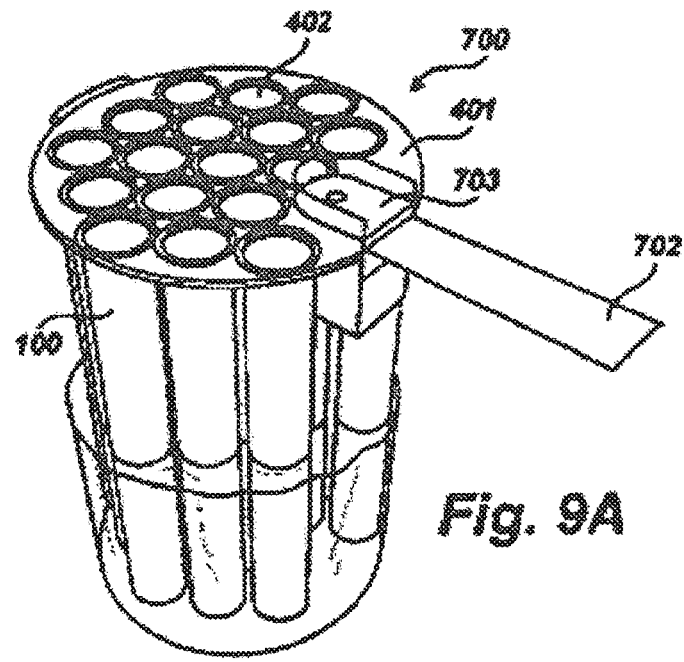
FIGS. 9A-9B are perspective views of the filtration system according to one embodiment of the present invention.
Figure 9B:
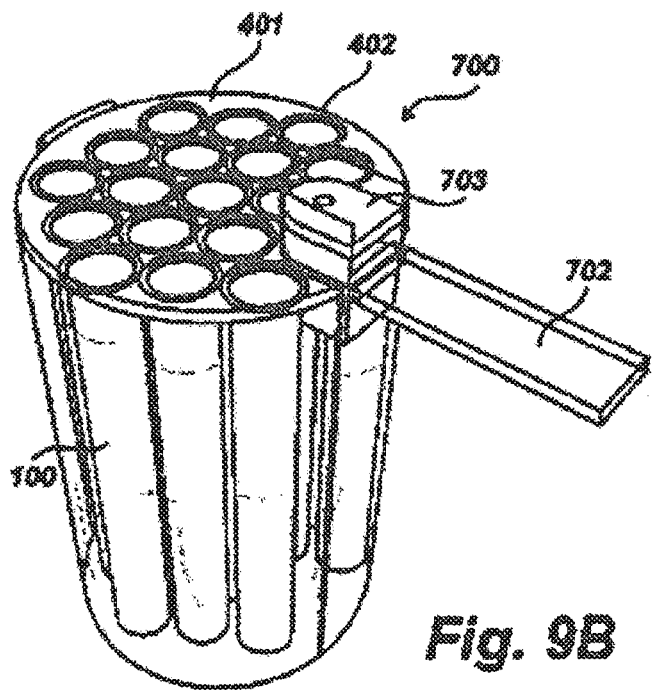

Referring to FIGS. 8 and 9A, inlet device 703 may also be positioned such that deck 805 may be level with the bottom of inlet line 702. In this arrangement, the influent stormwater flows simultaneously through hole 806 into filtration chamber 701, and also through mesh screen 804, through elements 100 and into filtration chamber 701, thus backwashing elements 100. Referring to FIGS. 8 and 9B, as the level of water in the filtration chamber rises, the inlet device 703 may rise until the top of base 801 may be level with the bottom of influent line 702. The influent stormwater may be directed into the filtration chamber 701 through hole 807, and normal filtration operation proceeds.

In normal operation, stormwater is introduced into filtration system 700 via inlet line 702. The stormwater flows through inlet device 703 and fills filtration chamber 701. As filtration chamber 701 fills with water, the aqueous portion of the stormwater permeates through each elongated filtration element 100. Fiberglass batting 201, which is exposed to the stormwater, traps a substantial amount of the sediment in the stormwater. As the aqueous portion flows through each elongated filtratable element 100, fiberglass batting 201 is pressed against backing mesh 202, forming a permeable filter bed. A deck 1000 separates filtration system 700 into two parts: a lower housing and an upper housing. In one embodiment, deck 1000 may be impermeable. After the lower housing of filtration system 700 fills completely with stormwater, influent stormwater accumulates on inlet device 703 creating the driving forces for stormwater to permeate through each elongated filtratable element 100. The aqueous portion, after permeating through filter mat 102, travels upward through elongated filtration element 100 and out holes 402 in filtration cartridge 400. Deck 1000 separates the influent stormwater from the filtrate. The filtrate then flows downstream away from the filtration system 700.

Figure 10A:
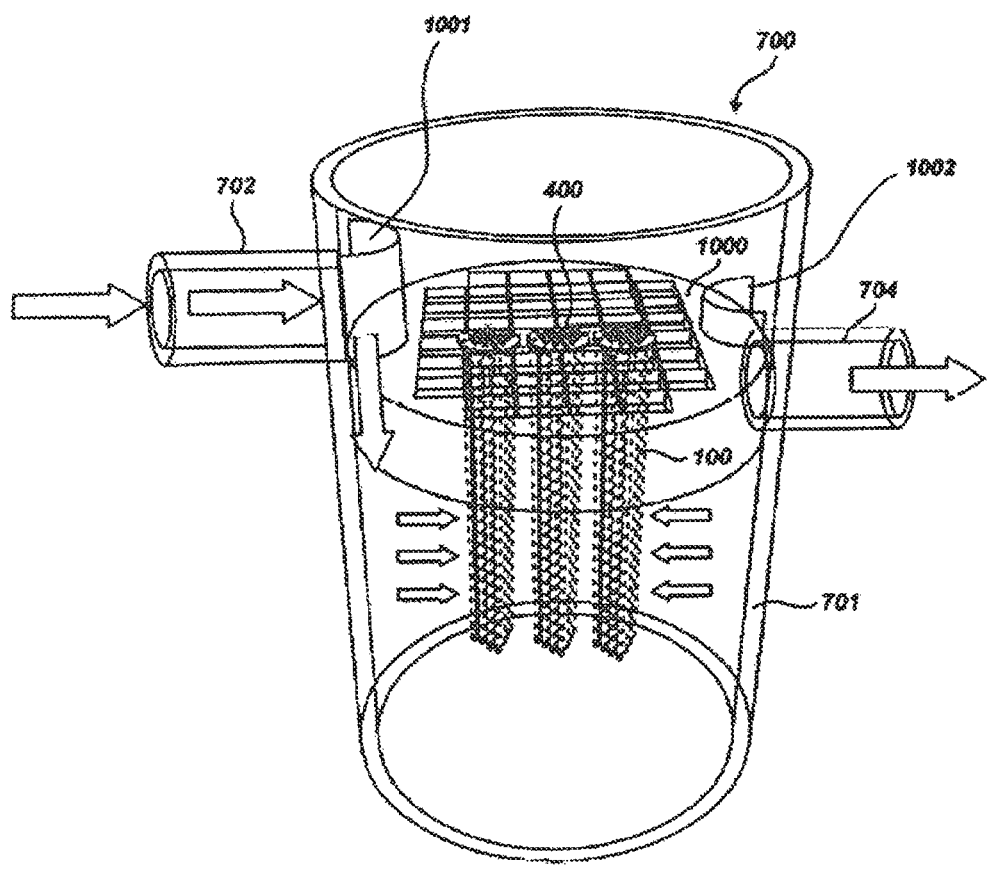
FIGS. 10A-10B are perspective views of a filtration system according to one embodiment of the present invention.

Referring to FIG. 10A, a filtration system with a backwashing mechanism is shown, according to one embodiment of the present invention. In this embodiment, filtration system 700 has an inlet impermeable weir 1001 and an outlet impermeable weir 1002. In operation, the stormwater flows through an inlet opening created by impermeable weir 1001 and fills filtration chamber 701. Impermeable weir 1001 separates the influent stormwater from the filtrate. As filtration chamber 701 fills with water, the aqueous portion of the stormwater permeates through each elongated filtration element 100. The filtrate then accumulates above deck 1000 until it overflows outlet impermeable weir 1002 and exits system 700. Outlet impermeable weir 1002 allows for a level of filtrate to accumulate above deck 1000. When flow stops, the stormwater that remains in lower chamber of filtration system 700 drains down through infiltration, connection to a dry well, or any other drain-down mechanism. As the water level in the lower chamber drops, the filtrate that is accumulated above deck 1000 flows downward through each filtration cartridge 400, backwashing each elongated filtratable element 100 and removing any trapped sediment.

Figure 10B:
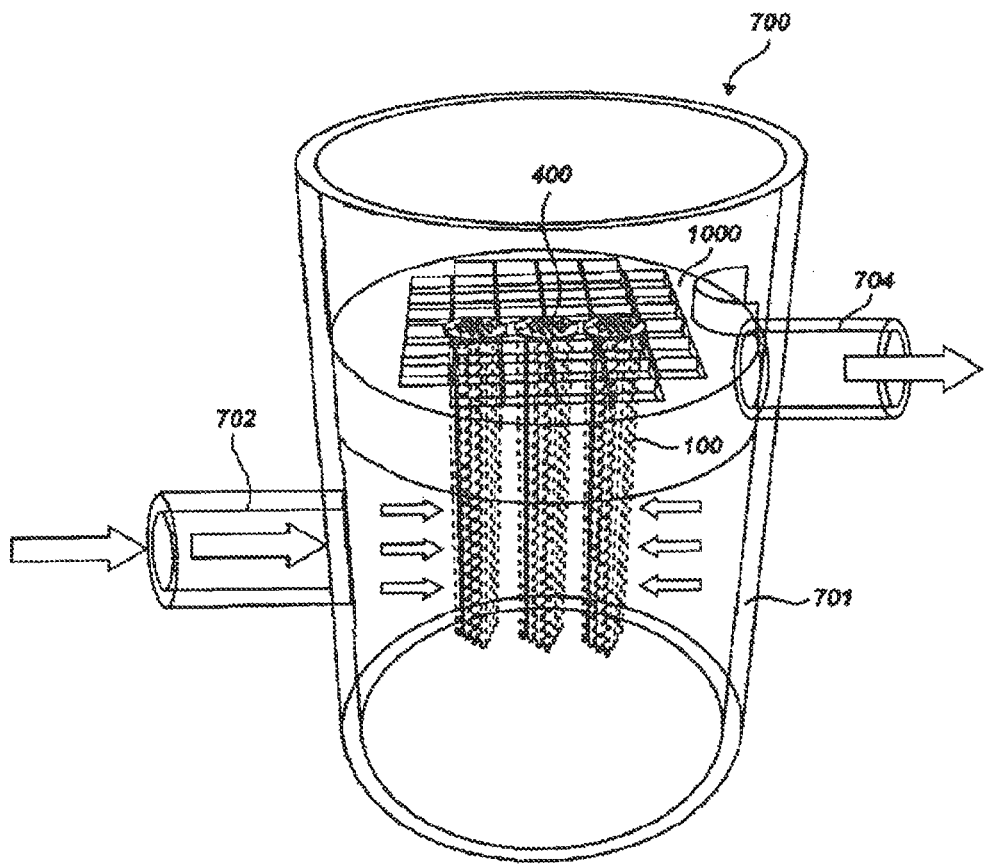

Referring to FIG. 10B, in another embodiment, inlet line 702 may feed directly into filtration chamber 701 beneath deck 1000. In this embodiment, inlet line 702 would be positioned, in relation to filtration chamber 701, so that a sufficient hydraulic head is created to cause stormwater to flow through elongated filtratable elements 100 and out outlet line 704. In general, this will require inlet line 702 to be positioned at a height above filtration chamber 701 and outlet line 704. For example, inlet line 702, at some point upstream of filtration chamber 701, may be elevated above filtration chamber 701 and then slope downward and connect to filtration chamber 701 below deck 1000.

Figure 11:
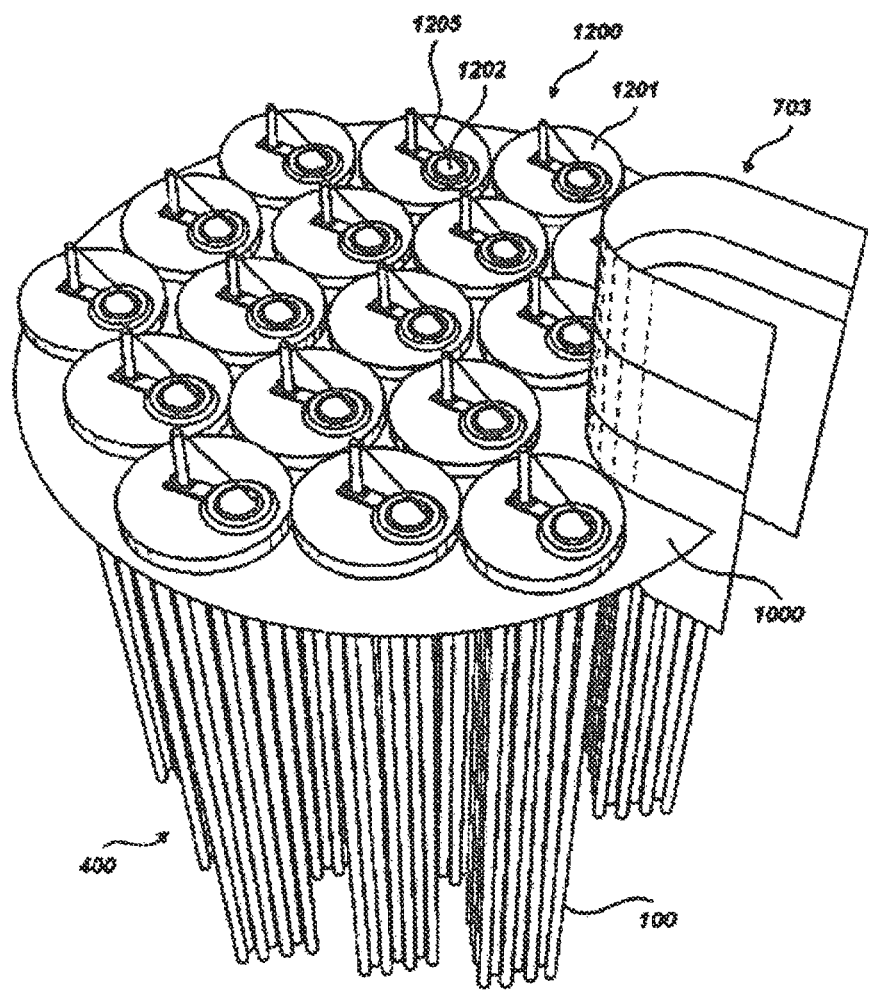
FIG. 11 is a perspective view of a filtration system with a backwashing mechanism according to one embodiment of the present invention.
Figure 12A:
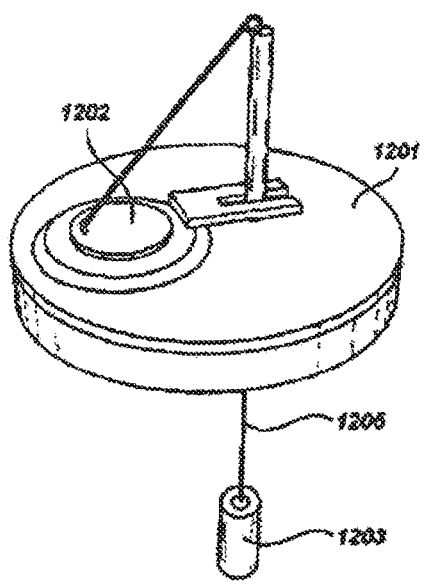
FIGS. 12A-12B are perspective views of a valve assembly according to one embodiment of the present invention.

Referring to FIG. 11, a filtration system with a backwashing mechanism is shown, according to another embodiment of the present invention. In this embodiment, filtration system 700 has a plurality of filtration cartridges 400 with each cartridge 400 being equipped with its own backwashing valve assembly 1200. Referring to FIG. 12A, valve assembly 1200 may generally include five components: a cartridge cover 1201, a release valve 1202, a float 1203, a hole 1204, and a tether 1205. In general, valve assembly 1200 enables each elongated filtratable element 100 to be backwashed between rain events in order to remove trapped sediment.

Figure 12B:
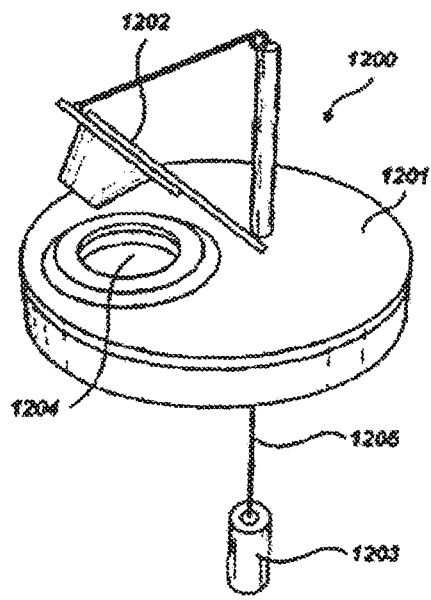

Cartridge cover 1201 may be adapted so that it sealably and removably covers each filtration cartridge 400 in filtration system 700. Tether 1205 attaches release valve 1202, which may be pivotally attached to cartridge cover 1201, to float 1203. Release valve 1202 may have a plug that fits into hole 1204. Valve assembly 1200 has two primary operating positions: a generally closed position, as shown in FIG. 12A, and an open position, as shown in FIG. 12B.

Figure 13:
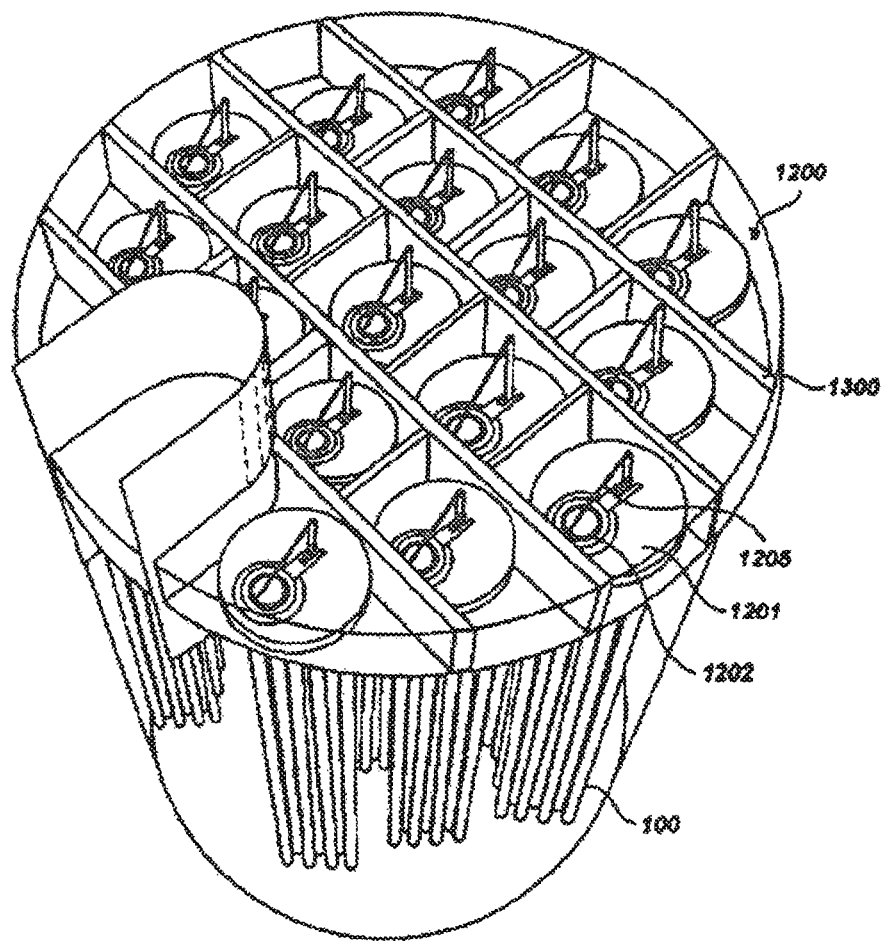
FIG. 13 is a perspective view of a filtration system with a backwashing mechanism with a partition, where accumulated filtrate is above each valve assembly according to one embodiment of the present invention.
Figure 14:
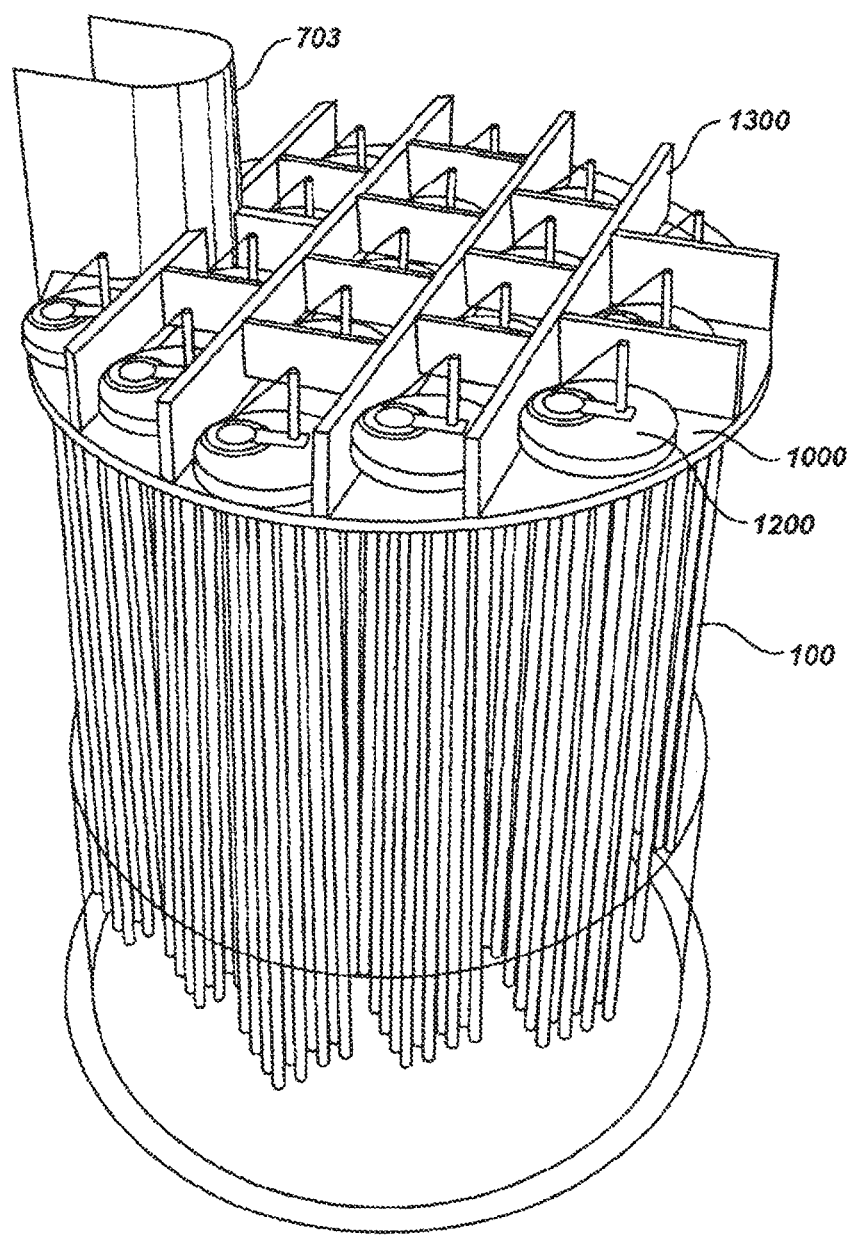
FIG. 14 is a perspective view of a filtration system with a backwashing mechanism where each elongated filtratable element has been backwashed according to one embodiment of the present invention.

Referring to FIGS. 13 and 14, filtration system 700 is in an operating position where stormwater has completely filled the lower housing and a small amount of filtrate has accumulated above each valve assembly 1200. In normal operation, not the backwashing operation, release valve 1200 may be slightly forced open by the filtrate flowing upward through filtration cartridge 400 so that filtrate accumulates on deck 1000 before it flows out of filtration system 700 via outlet 704. In one embodiment, as shown in FIG. 13, each valve assembly 1200 may be separated using a partition 1300 so that each filter cartridge 400 may have its own "tank" of filtrate for later use during backwashing. In this embodiment, outlet line 704 (not shown) may be at the level of the top of partition 1300.

During normal operation, filtrate flows up through each elongated filtratable element 100 as usual. When the flow of influent stormwater stops, release valve 1202 closes to prevent any of the filtrate that has accumulated on the upper housing of filtration system 700 from draining down through each filtration cartridge 400. When flow stops, the stormwater that remains in lower chamber of filtration system 700 drains down through infiltration, connection to a dry well, or any other drain-down mechanism. Float 1203 travels downward as the stormwater in the lower housing is drained. When the water level in the lower chamber drops to the desired level, release valve 1202 may be pulled open by float 1203 via tether 1205. In one embodiment, tether 1205 may be long enough to allow float 1203 to reach a level below each elongated filtratable element 100. When release valve 1202 opens, the "tank" of accumulated filtrate above each filtration cartridge 400 flushes downward, backwashing each filtratable element 100 and removing any trapped sediment.

Figure 15:
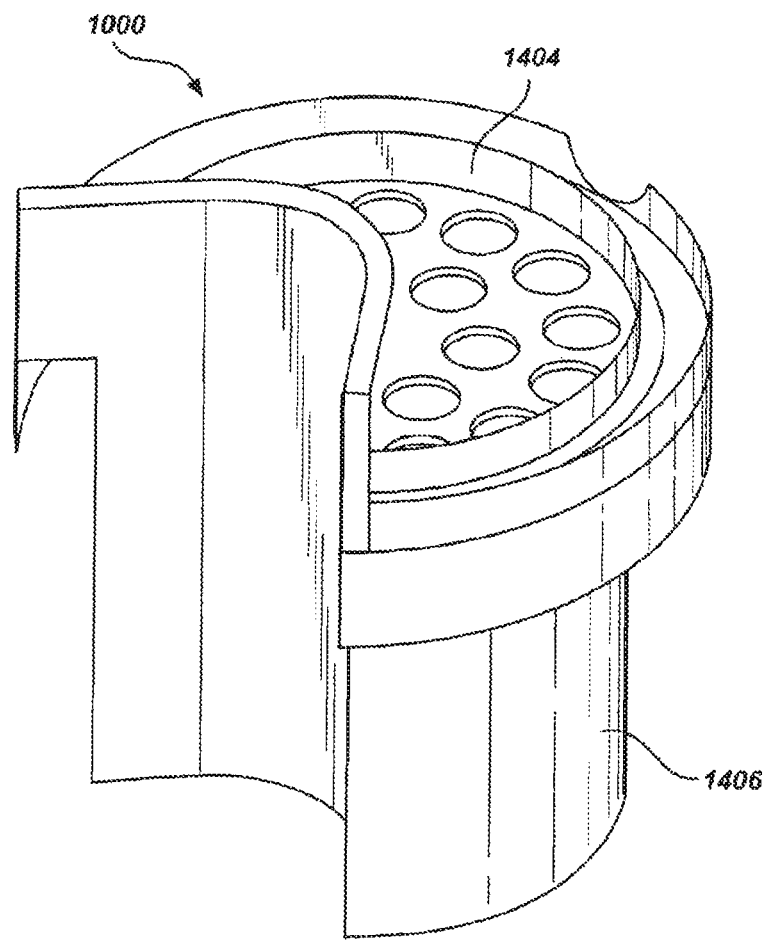
FIG. 15 is a perspective view of a deck for a filtration system according to one embodiment of the present invention.

Referring to FIG. 15, deck 1000 for filtration system 700 is shown according to one embodiment. In this embodiment, deck 1000 may be generally described as an insert that securely fits into filtration chamber 701. Deck 1000 may divide filtration chamber 701 into an upper chamber above deck 1000, and a lower chamber below deck 1000. Deck 1000 may have one or more holes for mounting one or more filtration cartridges (not shown). Further, deck 1000 may have a ridge 1404 attached to or integrally formed with the top surface of impermeable deck 1000. Ridge 1404 may form perimeter on deck 1000. Ridge 1404 may generally surround holes 1402. Ridge 1404 acts as an outlet weir for the filtered water that filters through each filtration cartridge 400. Ridge 1404 may be of any suitable height and thickness. Water may exit filtration system 700 by flowing over ridge 1404 and onto another portion of deck 1000, proceeding downstream via outlet line 704.

Deck 1000 may also have a skirt 1406. Skirt 1406 may be attached to or integrally formed with the bottom surface of deck 1000. Skirt 1406 may extend below deck 1000 at some distance. Skirt 1406 may substantially surround or entirely surround elongated filtratable elements 100 that reside in the lower chamber of filtration system 700. Skirt 1406 may be of any suitable length; it may extend beyond, be of the same length, or be shorter than elongated filtratable elements 100.

Figure 16:
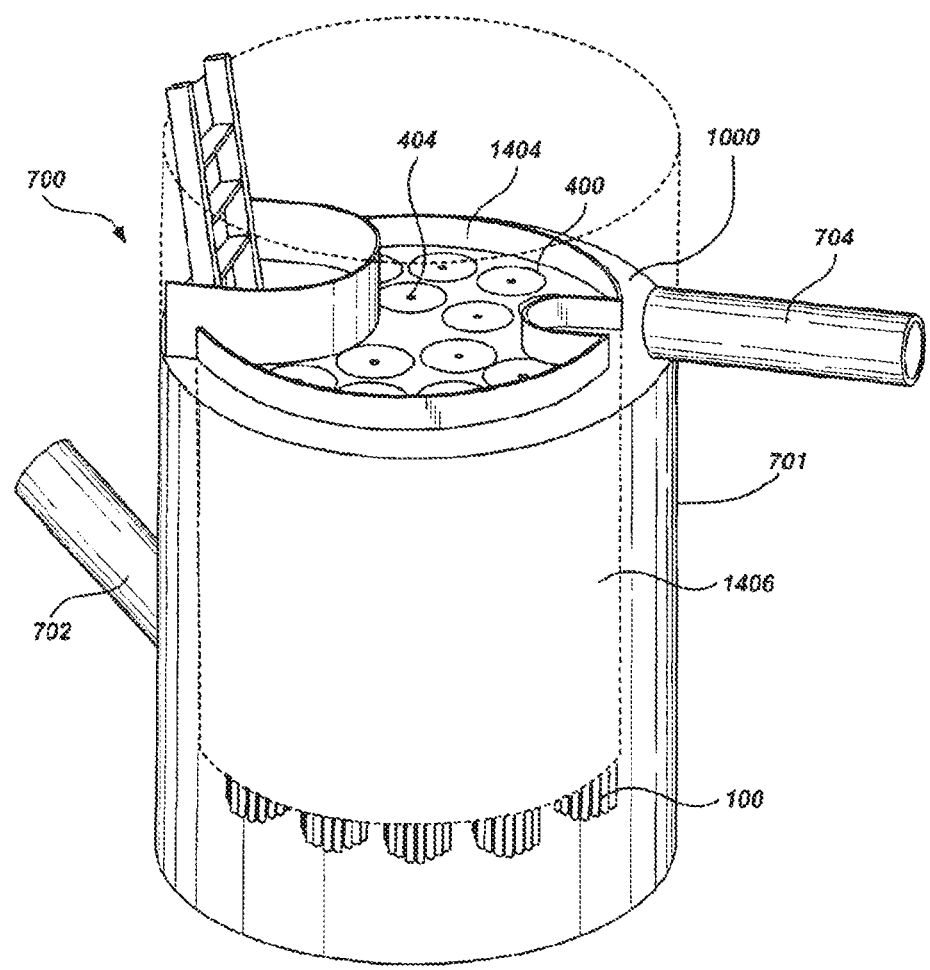
FIG. 16 is a side perspective view of a filtration system according to one embodiment of the present invention.

Referring to FIG. 16, another embodiment of filtration system 700 is shown according to one embodiment. In this embodiment, deck 1000, having ridge 1404 and skirt 1406, may be installed into filtration chamber 701. Deck 1000 may have a substantially circular outer perimeter and may be sized to fit within the walls of filtration chamber 701. Deck 1000 may also be shaped to provide access for maintenance. The access way may be of any shape and depth. The access way may allow for inspecting and maintaining filtration system 700. For example, a ladder, or ladder rungs, may be located within the access way.

In this embodiment, inlet line 702 may be located below deck 1000. Inlet line 702 may be located above the bottom of skirt 1406. Inlet line 702 may be tangential to filtration chamber 701. Therefore, influent may be introduced tangentially into filtration chamber 701 below deck 1000. Influent may be directed in a circular path around skirt 1406, which may allow coarse sediments to settle at the bottom of filtration chamber 701, and floatable pollutants to rise and be trapped underneath deck 1000 and outside of skirt 1406. In other words, influent is introduced into filtration system 700 via tangential inlet line 702. This arrangement causes the influent to "swirl" around skirt 1406, eventually flowing under skirt 1406, then upward and through elongated filtration elements 100. In this embodiment, each filtration cartridge 400 is shown as being covered by lid 404. The aqueous portion flows through each elongated filtratable element 100, through hole 406 in lid 404, and onto deck 1000. Filtered water accumulates above deck 1000 until it reaches a level to overflow ridge 1404. Water then exits filtration system 700 through outlet line 704.

Figure 17:
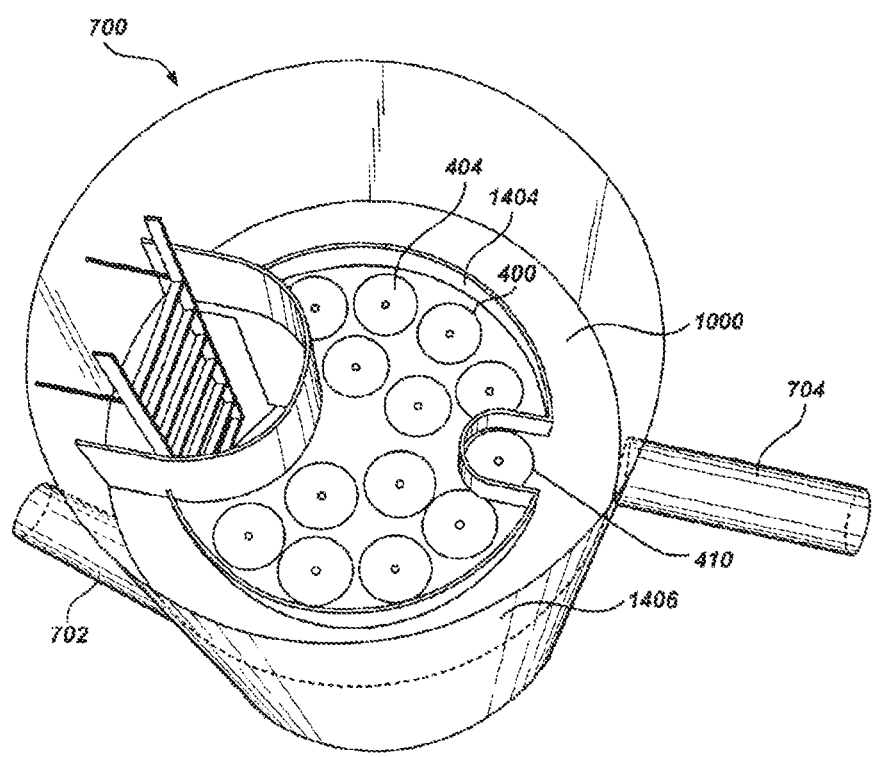
FIG. 17 is a top perspective view of a filtration system according to one embodiment of the present invention.

Referring to FIG. 17, one or more filtration cartridges 400 may be installed outside ridge 1404. For example, filtration cartridge 410 may be located outside of ridge 1404. This embodiment allows for backwashing of elongated filtratable elements 100. When flow subsides from inlet 702, water that has accumulated above deck 1000 and inside of ridge 1404 then flows backwards through filtration cartridges 400 located inside of ridge 1404. The water flows downward, through each elongated filtratable elements 100 and into the lower portion of filtration chamber 701. Because there is one or more filtration cartridges 400 located outside of ridge 1404, water then flows upward through one or more filtrations cartridges 400 installed outside of ridge 1404. Therefore, this embodiment allows for filtration cartridges 400 that are located inside of ridge 1404 to be backwashed with filtered water.

Figure 18:
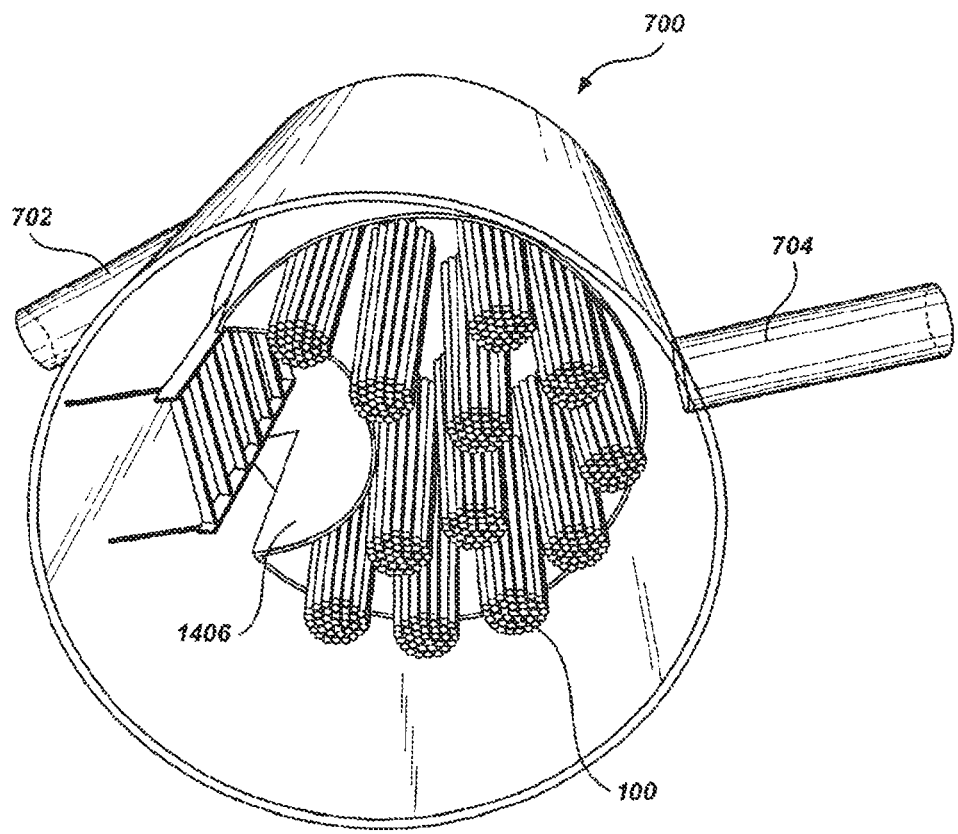
FIG. 18 is a bottom perspective view of a filtration system according to one embodiment of the present invention.

Referring to FIG. 18, a bottom view of one embodiment of filtration system 700 is shown. This embodiment shows that skirt 1406 surrounds elements 100 from each filtration cartridge 400, even the one or more filtration cartridges 400 that may be installed outside of ridge 1404. In another embodiment, skirt 1406 may not surround the filtratable elements 100 from each filtration cartridge. A portion of skirt 1406 may also define the access way.

Referring to FIG. 19, a side view of the filtration system 700 of FIG. 16 is provided, showing various features that may be incorporated into this or other embodiments. The filtration system 700 includes a filtration chamber 701 having an inlet 702 and an outlet 704. A deck 1000 divides the chamber 701 into an upper region 1902 and a lower region 1904. Access between the two regions may be provided by a service passage 1906 and ladder 1908. A number of filtration cartridges 400 pass through the deck 1000 into the lower region 1904. Each filtration cartridge 400 includes a plurality of elongated filtratable elements 100 (elements in the background are shown in dotted lines for clarity). The filtratable elements 100 of each filtration cartridge 400 are mounted to a manifold 401, which may be covered by a lid 404. An orifice 406 through the lid regulates the flow through each filtration cartridge 400. As explained herein, the orifices 406 can be sized such to induce various pulsing effects and vibrations during operation to assist in maintaining cleanliness of the filterable elements 100, and extending the frequency between required maintenance or replacement.

Below the deck 1000, a skirt 1406 surrounds the filtratable elements 100. As shown here and in FIG. 16, the skirt 1406 may surround all of the filtratable elements 100. As explained previously, the skirt helps prevent floating debris and lighter fluids from contacting the filtratable elements 100. The skirt 1406 also assists in creation of a flow path to extend the time for particulates to settle and floating debris and lighter fluids to rise and be captured within the channel that is created between the skirt and lower portion of the deck and structure wall.

Above the deck 1000, an overflow ridge 1404 surrounds one or more filtration cartridges 400. The overflow ridge 1404 collects water during high water events, and releases the water back down through the filters at the end of the event. In order for such backflushing to occur, a flow path must be provided to allow the water to go backwards through the filtration cartridges. One way of accomplishing this is to leave one or more filtration cartridges outside the overflow ridge 1404, as shown in FIGS. 16 and 19. Using this arrangement, water flows down through the filtration cartridges within the confines of the ridge 1404, and up through the filtration cartridge(s) located outside the ridge.

It is believed that a further backflushing effect may be created by the selection of the location and size of the hole(s) 406 through the filtration cartridge lid 404. As explained with reference to FIGS. 5A-D, the filtration cartridge 400 may have a number of filtratable elements 100 connected to a common manifold 401, and the manifold 401 may be covered by a lid 404 having one or more holes 406. Filtered water passes through the filtratable elements 100, through the manifold 401, and then through the hole 406. It has been found that when a single hole 406 is used, the water passing through the hole 406 forms a small vertical spout that cyclically rises and falls, in some cases generating a palpable vibration. Without being bound to any theory of operation, it is believed that the water being forced upwards by momentum through the hole 406 as a column, periodically falls back down onto itself, creating a pressure pulse that is conveyed through the incompressible water. In use, this pulsing vibration is believed to generate a small, but functional, backflow through the filtratable elements 100, or at least a vibration that tends to shake the filtratable elements 100. It is believed that this backflow or vibration helps prevent the accumulation of sediment and other debris on the filtratable element 100.

It is believed that the foregoing pulsing backflush effect may be enhanced by positioning the holes 402 through the manifold such that they are not equidistant from the hole 406 through the lid 404, possibly causing the water flowing through the various filtratable elements 100 to mix in a turbulent pulsing flow before it reaches the hole 406 through the lid. This effect also may be enhanced by forming the deck 1000 of rigid material, such as fiberglass, that can convey the pulsing vibrations. It also might be possible to reduce or enhance the backflush effect by resizing the hole, forming it with rounded or beveled edges, adding a pipe or other extension to the hole, reshaping the hole to something other than round, and so on.

This pulsing backflush effect also may be enhanced in embodiments in which the filtratable elements 100 have relatively high hydraulic conductance (i.e., are capable of passing relatively large volumes of water through them with relatively little head loss). In such embodiments, the hole 406 through the lid 404 may be sized to provide a substantial flow restriction to prevent high flow rates through the filtratable elements 100, which may be desirable to slow the flow through the system to encourage precipitation of sediment and to prevent blinding of the filters with large amounts of entrained sediment. In such embodiments, the many relatively unrestricted flows from the filtratable elements 100 converge at the hole 406, which acts as an restricting orifice that may generate reversed pulses or vibrations through the water.

In other embodiments the filtration cartridge outside the ridge 1404 may be omitted and replaced by a simple weep hole through the deck 1000 that allows the water to flow to the outlet 704, or a drain-down feature to allow the water to flow out through the bottom (or side) of the lower chamber 1904. If a drain-down feature is provided, it may facilitate backflushing and partially or wholly empty the contents of the filtration system 700 between storm events or upon control of a service technician. Drain-down may be provided through infiltration, connection to a dry well, or any other drain-down mechanism, as noted above. For example, a drain-down hole 1910 may be provided through the bottom of the filtration chamber 701, or the bottom of the filtration chamber 701 may simply be open. A filter 1912 optionally may be placed over the drain-down hole or other opening to remove pollutants from the water as it drains back into the soil. As the water level in the lower chamber 1904 drops, the filtrate that is accumulated above deck 1000 flows downward through each filtration cartridge 400, backwashing each elongated filtratable element 100 and removing trapped sediment. If the drain-down also substantially empties the liquid contents of the filtration chamber 701 between storm events, this may reduce the incidence of bacteria and insect growth. The flow rate through the drain-down feature may be controlled by using an orifice or the like. If desired, the drain-down feature may include a valve to open or close it, or to regulate the flow rate therethrough.

As will be appreciated from the foregoing explanation, the inclusion of an overflow ridge 1404 along with some mechanism to allow the liquid to drain back down through the filtration cartridges provides an automatic backflushing mechanism that operates whenever the fluid level recedes below the deck height. However, while such an automatic backflushing mechanism is desirable, it is not required of all embodiments.

The deck 1000 in the filtration system 700 may be constructed integrally with the chamber 701 (e.g., as a concrete slab), but instead may be made as a separate part that is installed into a simple cylindrical chamber 701. For example, in the shown embodiment, the deck 1000 may comprise a fiberglass insert that may have the ridge 1404, skirt 1406 and service passage attached to or formed as part of the deck 1000. Around its outer edge, the deck 1000 has upper and lower perimeter walls 1914, 1916, such as the walls shown in FIG. 15. The perimeter walls 1914, 1916 are configured to fit relatively closely within the chamber 701, so that connectors such as bolts can be passed through the walls 1914, 1916 to secure the deck 1000 to the chamber 701. The upper and lower perimeter walls 1914, 1916 also may be generally water-tight to create a double wall (in conjunction with the wall of the chamber 701) around the top of the lower chamber 1904 and the bottom of the upper chamber 1902. This double wall construction is expected to help reduce the release of hydrocarbons or other pollutants through the walls of the chamber 701, which may be particularly beneficial if the chamber 701 is formed of concrete, which may not fully resist such pollutants. The location of the double wall at the top of the lower chamber 1904 and bottom of the upper chamber 1902 may be particularly desirable, as these are the locations at which hydrocarbons are likely to accumulate. In the shown embodiment, the upper perimeter wall 1914 may be cut out at the outlet pipe 704 to permit the flow of fluid through the outlet 704. Also, the upper and lower perimeter walls 1914, 1916 may be omitted around the service passage 1906, as shown, or they may be continued all the way around the perimeter of the chamber 701.

Still referring to FIG. 19, embodiments of a filtration system 700 may position the elongated filtratable elements 100 above and spaced from the bottom wall of the chamber 701. This arrangement allows dirt and sediment to accumulate below the filtratable elements 100 without touching them, and without interfering with their filtration function. A large space is expected to permit greater sediment storage volume, and reduce the likelihood that an influx of water will entrain the sediment and raise it up to contact the filtratable elements 100.

It also may be desirable to mount the filtratable elements 100 to the manifold 401 without any supports or other structures along the lengths of the filtratable elements 100. Such supports might provide a space for sediment or debris to collect and remain in contact with the filtratable elements 100, and may interfere with the downward movement of dirt and debris during backflushing and by natural precipitation. An arrangement of filtratable elements 100 that lacks any kind of intermediate supports is shown, for example, in FIGS. 11 and 19. Where no intermediate supports are used, it may be desirable to reinforce the filtratable elements 100 to prevent them from moving excessively, but alternatively such movement may enhance natural cleaning of the filtratable elements 100. It has been found that omitting any kind of intermediate support along the length of the filtratable elements 100 may contribute to increased service life of filters used in the filtration system 700 by preventing any substantial localized accumulation of sediment of debris on the filtratable elements 100.

Referring now to FIG. 20, an example of another filtratable element 100 is illustrated and described. As noted above, the surface area of the filtratable elements 100 may be increased by pleating them. The filtratable element 100 in FIG. 20 comprises a filter medium 2002 that has been formed into pleats and rolled into a cylindrical shape. The filter medium 2002 may comprise any suitable filter material, or combination of material s, and may also include anti-microbial agents, sorbtive media, or other features. The filter medium 2002 may surround an internal frame 2004 to help retain the structure of the filter medium 2002. The filter medium 2002 also may be secured at its ends to upper and lower end caps 2006, 2008. In this embodiment, the upper end cap 2006 includes an outlet passage 2010 through which the filtrate passes. The outer surface 2012 of the outlet passage 2010 may include fastening elements (e.g., threads, bayonet fastener prongs or slots, etc.) for securing the element 100 to the manifold 401. For example, the outer surface 2012 may be threaded, so that it can be passed through a corresponding opening in the manifold and secured by tightening a nut onto the threads, the lower end cap 2008 may be closed to prevent fluid from bypassing the filter medium 2002. It is expected that closing the lower end cap 2008 also may help prevent an upward current of fluid at the bottom of the filtratable element 100, which may help prevent sediment from being entrained and rising up into contact with the filter medium 2002. The use of a closed lower end cap 2008 may be particularly beneficial in embodiments such as FIG. 19, where the filtratable elements 100 are elevated above the bottom of the chamber 701.

A pleated filtratable element 100 such as the embodiment in FIG. 20 might provide a significantly larger filtration surface area than a non-pleated element. This may be beneficial to increase service life, provide more tolerance for surface occlusion, and provide a higher hydraulic conductance that allows faster flows through the filtration system. For example, it is believed that a filtration system such as shown in FIG. 21 that uses pleated filtratable elements such as shown in FIG. 20 may have about ten times the flow rate for the footprint of the filtration system than conventional devices. The higher hydraulic conductance may allow the filtration system to operate at a relatively low head. If faster flows are not desired, one or more orifices or other flow restrictions may be used in conjunction with the pleated filtratable element 100. The orifices may be associated with the individual filtratable elements 100 (e.g., sizing or providing an orifice on the outlet passage 2010 to restrict flow), or with a manifold that collects the flow from multiple filtratable elements 100 (e.g., an orifice hole 406 through a lid 404 over a manifold 401).

FIG. 20 also illustrates how the filtratable element 100 may be divided into subparts 100', 100" that connect to one another to increase the length of the filtratable element 100. In this embodiment, an upper subpart 100' has a hole through its lower end cap 2008', and a lower subpart 100" has an outlet passage 2010' through its upper end cap 2008' that fits into the hole. The two subparts 100', 100" may be secured by any suitable means, such as threaded fasteners, adhesive, ultrasonic bonding, or the like.

FIG. 21 illustrates another embodiment of a filtration system. This embodiment includes a deck assembly 2100 that is positioned adjacent an inlet 2102. The chamber has been omitted from FIG. 21 to better visualize the remaining parts of the system. It will be appreciated that the shown parts can be fit into a chamber having an outlet and a sediment reservoir located below the deck assembly 2100, such as the chambers illustrated elsewhere herein.

The deck assembly 2100 includes a deck 2104 that divides the corresponding chamber into upper and lower portions. The deck 2104 is bounded by upper and lower perimeter walls 2106, 2108 by which the deck assembly 2100 may be connected to the chamber walls to secure it in place. The upper perimeter wall 2106 may include a cutout 2017 that partially surrounds the chamber outlet (not shown). A number of filter cartridge openings 2110 pass through the deck 2104 and each opening 2110 is configured to receive a respective filter cartridge such as the ones described previously herein. The deck 2104 may include an overflow ridge 2112 that segregates one of the filter cartridge openings 2110' to act as a bypass for backflushing the remaining filter cartridges. In this exemplary embodiment, the inlet 2102 is located above the deck, although a sub-deck location would be equally possible. The inlet 2102 is positioned over a deck inlet opening 2114. The deck opening 2114 may serve as a service passage. Alternatively, the service passage may be omitted, made separate from the inlet opening 2114, or be configured otherwise. The inlet opening 2114 may be surrounded by a barrier wall 2116 that directs incoming fluid below the deck 2104. A skirt 2120 (portions of which are visible through the cartridge openings 2110) may depend from the bottom of the deck 2104 to help segregate the filter cartridges from floating debris or relatively light liquids, as described previously herein.

In use, fluid enters through the inlet 2102, drops down through the deck inlet opening 2114, rises up through the filter cartridges, and exits through the outlet. Backflushing is provided by the overflow ridge 2112 such as described herein. During particularly high flows, the incoming fluid may rise up in the barrier wall 2116. The barrier wall 2116 may act as a weir that permits bypass flow when the flow rate exceeds the flow rate capacity of the filter cartridges, however it has been found that under such circumstances floating debris retained by the barrier wall 2116 can flow over the barrier wall 2116 and be carried out of the filtration system. To inhibit or prevent this from happening, the deck 2104 may include one or more bypass pipes 2118 that provide a fluid flow path through the deck 2104. The bypass pipes 2118 may be located within the skirt 2120 that depends from the bottom of the deck 2104, to thereby reduce the amount of floating or light fluid debris that is flushed out during bypass conditions. Alternatively, the bypass pipes 2118 may be located outside the skirt 2120, but may extend some distance from the bottom of the deck 2104 to position their inlets where they are less likely to permit the passage of floating debris and light fluids. Still another alternative would be to simply have the bypass pipes feed directly from just below the deck 2104, in which case they might be more susceptible to passing lighter fluids and floating debris.

Under some circumstances, it may be desirable to provide additional filtration or water cleaning devices in a filtration system. Examples of such additional devices are shown in FIG. 21, but it will be appreciated that similar devices may be used in other embodiments. As shown in FIG. 21, in one embodiment, a simple debris trap 2122 may be located below the inlet 2102. The debris trap 2122 is a relatively large mesh screen that catches particularly large debris that might be carried in through the inlet 2102. In other embodiments, a debris trap may be placed over the outlet, over the top of the inlet 2102 to prevent debris from rising over the barrier wall 2116, or at other locations.

Another device that may be used in this or other embodiments is a supplemental filter cartridge or sack 2124, such as a granular media filter that polishes the fluid, adsorbs pollutants that may be dissolved constituents such as nitrogen, phosphorus or metals, or otherwise contributes to cleaning the passing water. The supplemental filter cartridge or 2124 may be located such that all of the fluid is forced through it, but it is expected that simply having a supplemental adsorbent filter cartridge somewhere in the filtration system can be beneficial. For example, the shown supplemental filtration cartridge 2124 is located on the deck 2104 where some, but not all, of the fluid will pass through it. In another embodiment, the supplemental filtration cartridge may be a flexible tubular member 2126 that is located in the space between the overflow ridge 2112 and the upper perimeter wall 2106. In still another embodiment, the supplemental filtration cartridge may be formed as a rigid or flexible cover over some or all of the overflow ridge 2112. In still another embodiment, a supplemental filtration media may be provided inside the elongated filtratable elements 100 (e.g., inside the open space within the pleated filter shown in FIG. 20 or the filter shown in FIGS. 1A and 1B), or between the manifold 401 and the lid 404. The supplemental filtration cartridge may comprise a rigid chamber, or a permeable bag, or other suitable constructions. Regardless of the location, it may be desirable to ensure that the supplemental filtration cartridge 2124 cannot be dislodged and conveyed downstream during high flows. These or other supplemental cleaning devices preferably have sufficient capacity or service life that they can be serviced on the same schedule as the filter cartridges, but this is not strictly necessary.

An exemplary embodiment of a portable backflush unit 2200 for servicing stormwater filtration devices is shown in FIG. 22. The backflush unit 2200 comprises a vertical tube 2202 having an open top 2204 and a bottom floor 2206. A valve 2208 is mounted on the floor 2206 to selectively cover or expose an opening 2302 (FIG. 23C) through the floor 2206. The valve 2208 may be any suitable kind of valve. For example, the valve 2208 may comprise a sealing plate 2210 that is pivotally mounted to the floor 2206 by an arm 2212. The exemplary valve 2208 may be operated remotely by lifting a rope 2214 or chain that is connected to the sealing plate 2210 or arm 2212.

Referring to FIGS. 23A-C, the backflush unit 2200 is configured to cover a filtration cartridge 400. The unit 2200 may cover one or more filtration cartridges, but for ease of manipulation and use it may be desirable to be sized to fit over a single filtration cartridge. The backflush unit 2200 may include one or more seals (not shown) that help form a water-tight seal around the top of the filtration cartridge 400, but this is not strictly required. The backflush unit 2200 is operated by lowering it in to place above a filtration cartridge 400 (FIG. 23A), and then filling it with water 2304. Once the backflush unit 2200 is filled, the operator pulls up on the robe 2214 to open the valve 2208 and allow the water 2304 to flow backwards through the filter cartridge 400. To enhance the backflushing effect, the operator may drain or partially drain the filtration system below the level of the deck so that the backflush water does not need to displace and surrounding water to flow through the filter cartridge 400.

It is expected that a portable backflush unit 2200, such as the illustrated embodiment, will have particular utility for backflushing operations performed in installed filtration systems. The backflush unit 2200 can be constructed of lightweight materials, and can be dimensioned to fit through relatively small openings, making it easy to handle and use. To assist with its use, one or more handles 2306 may be provided.

It will be appreciated that many modifications and variations can be made to the illustrated backflush unit 2200. For example, it can have any suitable shape instead of being cylindrical. Also, the valve can be replaced by any suitable fluid control device, and can be operated by any suitable mechanism (e.g., a lever or pushrod). These and other variations will be apparent to persons of ordinary skill in the art in view of the present disclosure.

FIGS. 24A-C illustrate another embodiment of a filtration system 2400. Here, the filtration system 2400 includes a catch basin 2402 and a filtration chamber 2404 that are located adjacent one another in a side-by-side arrangement. The catch basin receives incoming flow either from a curb inlet 2406 or from an opening 2408 through the top wall 2410. A suitable grate or other screen may be placed over either the inlet 2406 or the opening 2408. The opening 2408 may be used to access the catch basin 2402, and may be closed during normal use (i.e., to only receive flow from the curb inlet 2406). A similar covered opening may be provided over the filtration chamber 2404 for service access.

The filtration chamber 2404 is divided into upper and lower portions by a deck 2412. A number of filtration cartridges 2414 provide a fluid flow path through the deck 2412. A ridge 2416 may be provided on the deck 2412, with one or more filtration cartridges 2414' located on the downstream side of the ridge 2416 to act as a drain-down filter to permit backwashing of the remaining filters, such as described previously herein. A bypass 2418 also may be provided through the deck 2404 to allow flow during high flow events. An outlet 2420 is located above the deck 2404 to receive and remove filtered water. A skirt 2422 divides the catch basin 2402 from the filtration chamber 2404. The skirt 2422 extends downward from the top of the chamber (or from a height where the fluid level is not expected to reach during any typical conditions), to an elevation spaced from the bottom of the chamber, leaving a space for water to flow laterally from the catch basin to the filtration chamber. A drain-down or other features may be provided, if desired.

It will be appreciated that a filtration system as described herein or having other constructions may be used in conjunction with other water treatment devices. For example, an embodiment such as the embodiment of FIG. 16 may be used downstream of a gravity separation system, and upstream of a sorbtive media filtration system. Embodiments also may be reconfigured to fit into catch basin systems that have a catch basin and a filtration system integrated into a single chamber. Embodiments also may be modified to fit into pre-existing water treatment devices. For example a deck assembly similar to the one shown in FIG. 21 may be modified to fit into a pre-existing well (that was either empty or previously contained some other separation or filtering system), or to be integrated as part of a preexisting separation or filtration device (e.g., shaped to fit into a downdrain of a gravity separation system). Other modifications and uses will be apparent in view of the present disclosure.

Example. An experiment was conducted using five filtration cartridges, each having eighteen elongated filtratable elements, for a total of 90 elements. Each elongated filtratable element was constructed by wrapping filter mats around a flexible inner core, and enclosing the filter mats in a nylon screen. Each filtratable element was 0.75" in diameter and 48" long. The elongated filtratable elements tested had a surface area of about 90 square feet. The filtration cartridges were placed inside a 3' diameter filtration chamber. With less than 5 inches of head loss, the prototype filtration system was able to remove over 5 kg of sil-co-sil 106 (a standard fine sediment mixture) from the influent water having a flow rate of 1 L/s and a sediment concentration of 300 mg/L. The filter cartridge occupied approximately 1 square foot of area in an impermeable deck separating the unfiltered and filtered water. The effluent water stream had a sediment content less than 20% of the influent concentration. It is reasonable to assume, based on these results, that this type of device could remove fine sediment for the runoff generated by an acre of impervious area, be contained in a chamber less than 10 feet in diameter, and last for over 1 year before the filter had clogged or needed to be replaced. The total suspended solid removal, or sediment removal, efficiency was 90-92%.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A water runoff system for removing suspended particles from a liquid, the system comprising:
  a filter vessel defining an internal chamber;
  a deck positioned within the internal chamber and dividing the internal chamber into an upper chamber and a lower chamber, the deck having a plurality of holes formed therein, each hole having a filtration element therein;
  an outlet above the deck for permitting liquid to exit the upper chamber;
  an inlet line for introducing a liquid into the internal chamber for treatment flow that passes through the lower chamber, up through the filtration elements and to the outlet;
  a ridge positioned atop the deck, the ridge forming an outlet weir atop the deck;
  a plurality of the filtration elements are first filtration elements positioned to a first side of the ridge so that treatment flow of the liquid upward through the first filtration elements passes over the outlet weir to reach the outlet; and
  at least one the filtration elements is a second filtration element positioned to a second side of the ridge so that treatment flow of the liquid upward through the second filtration element reaches the outlet without passing over the outlet weir;
  wherein when flow of the liquid subsides from the inlet, liquid that has accumulated above the deck and on the first side the ridge flows downward through the first filtration elements and into the lower chamber and up through the second filtration element to the outlet, thereby backwashing the first filtration elements.

2. The system of claim 1, wherein at least one of the first filtration elements comprises a filtration cartridge.

3. The system of claim 1, further comprising a skirt that is positioned below the deck and surrounds the first filtration elements and the second filtration element.

4. A system for removing suspended particles from a liquid, the system comprising:
  a filter vessel defining an internal chamber;
  a deck positioned within the internal chamber and dividing the internal chamber into an upper chamber and a lower chamber, the deck having a plurality of holes formed therein, each hole having a filtration cartridge mounted therein and extending down into the lower chamber;
  an inlet for introducing a liquid into the internal chamber for a treatment flow through the internal chamber;
  an outlet for passing liquid out of the internal chamber;
  wherein the treatment flow passes through the lower chamber, up through the filtration cartridges to the upper chamber and then to the outlet; and
  a ridge positioned atop the deck, wherein the ridge forms an outlet weir atop the deck, at least one of the filtration cartridges is positioned as a first filtration cartridge on a first side of the ridge so that liquid that moves upward through the first filtration cartridge for filtration during the treatment flow exits the internal chamber by passing over the ridge to reach the outlet of the internal chamber, and when flow of the liquid into the internal chamber subsides the treatment flow also subsides, and liquid that has accumulated above the deck on the first side of the ridge then flows downward through the first filtration cartridge to backwash the first filtration cartridge, causing liquid in the lower chamber to flow upward through another opening in the deck on the second side of the ridge and then to the outlet of the internal chamber without passing over the ridge;

wherein the another opening in the deck contains an additional filtration cartridge, and when flow into the internal chamber subsides, liquid that flows upward through the another opening passes through the additional filtration cartridge.

5. The system of claim 4, further comprising:
a skirt positioned on a bottom surface of the deck and extending below the deck into the lower chamber.

6. The system of claim 5, wherein the skirt surrounds at least one of the filtration cartridges.

7. The system of claim 5, wherein the skirt surrounds all of the filtration cartridges.

8. The system of claim 4 wherein the additional filtration cartridge has a lid with at least one hole sized to induce a pulsing/vibration effect such that during backwash water flowing upward through the at least one hole in the lid creates a vibration.

9. The system of claim 4 wherein each of the filtration cartridges comprises a plurality of elongated filter elements extending downward into the lower chamber, each filter element comprising a pleated filter member disposed around an internal frame to help retain a form of the pleated filter member and to define an internal flow space within the filter element.

10. The system of claim 9 wherein each filter element further comprises an upper cap engaged with a top portion of the pleated filter member and a lower cap engaged with a bottom portion of the pleated filter member.

11. A system for removing suspended particles from a liquid, the system comprising:
a filtration chamber having an inlet for introducing liquid into the filtration chamber for a treatment flow through the filtration chamber, and an outlet for treated liquid;
a deck positioned within the filtration chamber and dividing the filtration chamber into an upper chamber and a lower chamber, a raised outlet weir atop the deck, wherein the deck includes a plurality of holes therein including multiple first holes at a first side of the outlet weir and at least one second hole at a second side of the outlet weir;
wherein each first hole has a respective first filtration element mounted therein;
wherein the treatment flow through the filtration chamber passes through the lower chamber, up through the first filtration elements to the upper chamber and then over the outlet weir to reach the outlet; and
when flow of the liquid into the filtration chamber via the inlet subsides the treatment flow subsides, and liquid that has accumulated above the deck on the first side of the outlet weir then flows downward through the first filtration elements to backwash the first filtration elements, causing liquid in the lower chamber to flow upward through the second hole in the deck and then to the outlet without passing over the outlet weir;
wherein the second hole in the deck includes a second filtration element mounted therein, and when the treatment flow subsides, liquid that flows upward through the second hole passes through the second filtration element.

12. A system for removing suspended particles from a liquid, the system comprising:
a filtration chamber having an inlet for introducing liquid into the filtration chamber for a treatment flow through the filtration chamber, and an outlet;
a deck positioned within the filtration chamber and dividing the filtration chamber into an upper chamber and a lower chamber, a raised outlet weir atop the deck, wherein the deck includes a plurality of holes therein including multiple first holes at a first side of the outlet weir and at least one second hole at a second side of the outlet weir;
wherein each first hole has a respective first filtration element mounted therein;
wherein the treatment flow passes through the lower chamber, up through the first filtration elements to the upper chamber, over the outlet weir and then to the outlet; and
when flow of the liquid into the filtration chamber via the inlet subsides, the treatment flow also subsides, and liquid that has accumulated above the deck on the first side of the outlet weir then flows downward through the first filtration elements to backwash the first filtration elements, causing liquid in the lower chamber to flow upward through the second hole in the deck and then to the outlet without passing over the outlet weir;
wherein the second hole in the deck includes a second filtration element mounted therein, and when the treatment flow subsides, liquid that flows upward through the second hole passes through the second filtration element.

* * * * *